US009702588B2

(12) United States Patent
Yokoyama et al.

(10) Patent No.: US 9,702,588 B2
(45) Date of Patent: *Jul. 11, 2017

(54) AIR CONDITIONING APPARATUS

(71) Applicant: DAIKIN INDUSTRIES, LTD., Osaka-shi, Osaka (JP)

(72) Inventors: Naofumi Yokoyama, Sakai (JP); Takahiro Yamasaki, Sakai (JP); Takashi Kashihara, Sakai (JP); Tsuyoshi Yokomizo, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 166 days.

This patent is subject to a terminal disclaimer.

(21) Appl. No.: 14/687,233

(22) Filed: Apr. 15, 2015

(65) Prior Publication Data
US 2015/0300688 A1    Oct. 22, 2015

(30) Foreign Application Priority Data

Apr. 18, 2014  (JP) .................................. 2014-086206

(51) Int. Cl.
| | | |
|---|---|---|
| F24F 7/06 | (2006.01) |
| F24F 7/007 | (2006.01) |
| F24H 9/00 | (2006.01) |
| F24F 1/00 | (2011.01) |
| F24F 11/00 | (2006.01) |
| F24H 3/04 | (2006.01) |

(52) U.S. Cl.
CPC ......... *F24H 9/0073* (2013.01); *F24F 1/0007* (2013.01); *F24F 11/0079* (2013.01); *F24H 3/0411* (2013.01); *F24F 2001/004* (2013.01); *F24H 2250/02* (2013.01); *Y02B 30/746* (2013.01)

(58) Field of Classification Search
CPC .. F24H 9/0073; F24H 1/0007; F24H 11/0079; F24H 3/0411; F24F 2001/004; F24H 2250/02; Y02B 30/746
USPC ........................................................ 454/249
See application file for complete search history.

(56) References Cited

U.S. PATENT DOCUMENTS

| | | | |
|---|---|---|---|
| 2005/0109054 A1* | 5/2005 | Eom ...................... | F24F 1/0007 62/286 |
| 2008/0070493 A1* | 3/2008 | Rimmer ................ | F24F 1/0007 454/186 |
| 2016/0135283 A1* | 5/2016 | Chauvin ............ | H05K 7/20163 361/697 |

FOREIGN PATENT DOCUMENTS

| | | | | |
|---|---|---|---|---|
| FR | WO 2014195610 A1 * | 12/2014 | ............... | G01S 1/76 |
| JP | 6-281194 A | 10/1994 | | |

* cited by examiner

*Primary Examiner* — Helena Kosanovic
(74) *Attorney, Agent, or Firm* — Global IP Counselors, LLP

(57) ABSTRACT

An air conditioning apparatus includes a casing having intake and blow-out ports, a partition member dividing an interior of the casing, a heat exchanger, and a centrifugal fan. The partition member has a fan entrance bored in opposition to the blow-out port. The centrifugal fan includes a bladed wheel mounted in the fan compartment such that a rotary shaft of the bladed wheel is oriented along the fan entrance and the blow-out port. The rotary shaft is disposed adjacent to a bladed wheel nearby lateral part of multiple lateral parts of the casing that are disposed along the opening direction of the fan entrance and the opening direction of the blow-out port. The blow-out port is at least partially disposed in a position adjacent to a blow-out port nearby lateral part of the multiple lateral parts of the casing and being opposed to the bladed wheel nearby lateral part.

6 Claims, 14 Drawing Sheets

AIR CONDITIONING APPARATUS

CROSS-REFERENCE TO RELATED APPLICATIONS

This application claims priority under 35 U.S.C. §119 to Japanese Patent Application No. 2014-086206, filed Apr. 18, 2014. The entire disclosure of Japanese Patent Application No. 2014-086206 is hereby incorporated herein by reference.

FIELD OF THE INVENTION

The present invention relates to an air conditioning apparatus, particularly to an air conditioning apparatus that a rearward bladed centrifugal fan is mounted in a fan compartment having a fan entrance bored in opposition to a blow-out port such that a rotary shaft of the centrifugal fan is oriented to an opening direction of the fan entrance and an opening direction of the blow-out port.

BACKGROUND INFORMATION

As described in Japan Laid-open Patent Application Publication No. H06-281194, an air conditioning apparatus has been produced so far that a rearward bladed centrifugal fan is mounted in a ventilation unit (a fan compartment) having a fan entrance bored in opposition to a blow-out port such that a rotary shaft of the centrifugal fan is oriented to an opening direction of the fan entrance and an opening direction of the blow-out port. In the air conditioning apparatus, when a unit case (a casing) is seen from a direction along the rotary shaft of the centrifugal fan, a bladed wheel of the centrifugal fan is disposed such that the rotary shaft is located in the middle of the casing, and the blow-out port is located in the middle of the casing. Furthermore, air blown out by the bladed wheel is directed to flow closely to the middle of the casing by a wind guide plate, and is configured to be fed to the outside of the casing from the blow-out port.

SUMMARY

When the casing is herein seen from the direction along the rotary shaft of the centrifugal fan, air blown out by the bladed wheel of the centrifugal fan tends to swirl in a rotary direction of the bladed wheel and simultaneously flow along the lateral parts of the casing. Therefore, as described in Patent Literature 1, the construction for directing air blown out by the bladed wheel of the centrifugal fan to flow closely to the middle of the casing can be interpreted as forcibly changing the airflow that air blown out by the bladed wheel of the centrifugal fan swirls and flows along the lateral parts of the casing. Put differently, the construction of Japan Laid-open Patent Application Publication No. H06-281194 does not well consider the flow tendency of air blown out from the rearward bladed centrifugal fan that is mounted in the fan compartment such that the rotary shaft is oriented to the opening direction of the fan entrance and the opening direction of the blow-out port. Thus, the construction cannot be interpreted as being designed to sufficiently enhance the ventilation performance of the centrifugal fan. Consequently, it is demanded to enhance the ventilation performance of the centrifugal fan in consideration of the flow tendency of air blown out from the centrifugal fan.

It is an object of the present invention to enhance the ventilation performance of a centrifugal fan in an air conditioning apparatus that a rearward bladed centrifugal fan is mounted in a fan compartment having a fan entrance bored in opposition to a blow-out port such that a rotary shaft of the centrifugal fan is oriented to an opening direction of the fan entrance and an opening direction of the blow-out port.

An air conditioning apparatus according to a first aspect includes a casing, a partition member, a heat exchanger and a centrifugal fan. The casing has an intake port and a blow-out port. The partition member divides an interior of the casing into a heat exchanger compartment located on an intake port side and a fan compartment located on a blow-out port side, and has a fan entrance that is bored in opposition to the blow-out port and makes the heat exchanger compartment and the fan compartment communicate with each other. The heat exchanger is mounted in the heat exchanger compartment. The centrifugal fan includes a bladed wheel having a plurality of rearward blades and is configured to suck air existing in the heat exchanger compartment into the fan compartment through the fan entrance, with the bladed wheel being mounted in the fan compartment such that a rotary shaft of the bladed wheel is oriented to an opening direction of the fan entrance and an opening direction of the blow-out port. Furthermore, the rotary shaft of the bladed wheel is disposed in a position close to a bladed wheel nearby lateral part, which is one of lateral parts of the casing that are disposed along the opening direction of the fan entrance and the opening direction of the blow-out port. Additionally, the blow-out port is at least partially disposed in a position close to a blow-out port nearby lateral part, which is another of the lateral parts of the casing and is opposed to the bladed wheel nearby lateral part.

As described above, the rotary shaft of the bladed wheel is herein designed to be disposed closely to the bladed wheel nearby lateral part, and the blow-out port is designed to be at least partially disposed closely to the blow-out port nearby lateral part opposed to the bladed wheel nearby lateral part. With the construction, air blown out by the bladed wheel of the centrifugal fan can be herein smoothly directed to the blow-out port without changing its swirling flow tendency and its flow tendency along the lateral parts of the casing as much as possible.

Consequently, the ventilation performance of the centrifugal fan can be herein more enhanced than a well-known configuration of directing air, blown out by the bladed wheel of the centrifugal fan, to flow closely to the middle of the casing.

An air conditioning apparatus according to a second aspect relates to the air conditioning apparatus according to the first aspect, and further includes a heat sink for cooling an electric component. The heat sink is mounted in a blow-out port non-opposed space, which is a region not opposed to the blow-out port within a fan downwind space that is located on a downwind side of the bladed wheel within the fan compartment.

As described above, when herein disposed in the fan downwind space, the heat sink is designed to be disposed in the blow-out port non-opposed space. With the construction, the heat sink can be herein disposed so as not to be adjacent to the blow-out port.

Consequently, the heat sink can be disposed in the fan downwind space, and simultaneously, degradation in ventilation performance of the centrifugal fan can be inhibited as much as possible.

An air conditioning apparatus according to a third aspect relates to the air conditioning apparatus according to the second aspect, and further includes a blow-out port non-opposed surface part that forms the blow-out port non-opposed space and is opposed to the fan entrance in a position on the downwind side of the bladed wheel. Furthermore, the blow-out port non-opposed surface part forms a slope that slants so as to be gradually away from the bladed wheel from a side near to the fan entrance to a side near to the blow-out port, and the heat sink is disposed on the slope.

As described above, when herein disposed in the blow-out port non-opposed space, the heat sink is designed to be disposed on the slope formed by the blow-out port non-opposed surface part. With the construction, the heat sink can be herein disposed such that air blown out by the bladed wheel of the centrifugal fan can flow at a high speed without increasing ventilation resistance as much as possible.

Consequently, the heat sink can be herein disposed in the blow-out port non-opposed space such that the electric component can be efficiently cooled and simultaneously degradation in ventilation performance of the centrifugal fan can be inhibited as much as possible.

An air conditioning apparatus according to a fourth aspect relates to the air conditioning apparatus according to the third aspect, and wherein the bladed wheel has a hub that connects blow-out port side ends of the rearward blades and is configured to be rotated about the rotary shaft. Moreover, the air conditioning apparatus further includes a fan motor that is coupled to the hub and is mounted in the fan downwind space, and the slope is disposed so as to overlap with the fan motor when seen from a direction along the rotary shaft.

As described above, when the fan motor is herein disposed in the fan downwind space, the slope is designed to overlap with the fan motor when seen from the direction along the rotary shaft. With the construction, the fan motor and the slope on which air blown out by the bladed wheel of the centrifugal fan flows at a high speed can be herein disposed adjacently to each other in a direction orthogonal to the rotary shaft.

Consequently, the fan motor can be herein disposed in the fan downwind space so as to be capable of being efficiently cooled by air blown out by the bladed wheel of the centrifugal fan.

An air conditioning apparatus according to a fifth aspect relates to the air conditioning apparatus according to the third aspect, and wherein the bladed wheel has a hub that connects blow-out port side ends of the rearward blades and is configured to be rotated about the rotary shaft. Moreover, the air conditioning apparatus further includes a fan motor that is coupled to the hub and is mounted in the fan downwind space, and the slope is disposed so as to overlap with the fan motor when seen from a direction orthogonal to the rotary shaft.

As described above, when the fan motor is herein disposed in the fan downwind space, the slope is designed to overlap with the fan motor when seen from the direction orthogonal to the rotary shaft. With the construction, the fan motor and the slope on which air blown out by the bladed wheel of the centrifugal fan flows at a high speed can be herein disposed adjacently to each other in the direction along the rotary shaft.

Consequently, the fan motor can be herein disposed in the fan downwind space so as to be capable of being efficiently cooled by air blown out by the bladed wheel of the centrifugal fan.

An air conditioning apparatus according to a sixth aspect relates to the air conditioning apparatus according to the second or third aspect, and wherein the bladed wheel has a hub that connects blow-out port side ends of the rearward blades and is configured to be rotated about the rotary shaft. Moreover, the air conditioning apparatus further includes a fan motor that is coupled to the hub and is mounted in the fan downwind space, and the heat sink is disposed so as not to at least partially overlap with the fan motor when seen from a direction along the rotary shaft.

As described above, when the fan motor is herein disposed in the fan downwind space, the heat sink is designed not to at least partially overlap with the fan motor when seen from the direction along the rotary shaft. With the construction, two components for which cooling is required, i.e., the heat sink and the fan motor can be herein disposed so as to be displaced from each other.

Consequently, the heat sink and fan motor can be herein disposed in the fan downwind space such that the electric component and the fan motor can be efficiently cooled by air blown out by the bladed wheel of the centrifugal fan.

An air conditioning apparatus according to a seventh aspect relates to the air conditioning apparatus according to any one of the first to third aspects, and wherein the bladed wheel has a hub that connects blow-out port side ends of the rearward blades and is configured to be rotated about the rotary shaft. Moreover, the air conditioning apparatus further includes a fan motor that is coupled to the hub and is mounted in the fan downwind space, and the hub does not have a motor cooling aperture to be bored for cooling the fan motor by causing air blown out to the fan downwind space by the bladed wheel to partially flow hack to the bladed wheel therethrough.

As described above, when the fan motor is herein disposed in the fan downwind space, the hub of the bladed wheel is designed not to have a motor cooling aperture. With the construction, it is herein possible to eliminate the airflow that air blown out to the fan downwind space by the bladed wheel partially flows back to the bladed wheel through the motor cooling aperture.

Consequently, degradation in ventilation performance of the centrifugal fan can be herein inhibited.

An air conditioning apparatus according to an eighth aspect relates to the air conditioning apparatus according to any one of the second to sixth aspects, and further includes heating means for heating air blown out to the fan downwind space by the bladed wheel. The heating means is mounted in a blow-out port opposed space, which is a region opposed to the blow-out port within the fan downwind space. Furthermore, the heat sink is disposed on an upwind side of the heating means.

As described above, when the heating means is herein disposed in the fan downwind space, the heating means is designed to be mounted in the blow-out port opposed space whereas the heat sink is designed to be disposed on the upwind side of the healing means. With the construction, air blown out by the bladed wheel of the centrifugal fan is herein configured to cool the electric component and be then heated by the heating means. Thus, the electric component can be cooled by air with lower temperature in comparison with when the heating means is disposed on the upwind side of the heat sink.

Consequently the heat sink and the heating means can be herein disposed in the fan downwind space such that the electric component can be efficiently cooled by air blown out by the bladed wheel of the centrifugal fan.

BRIEF DESCRIPTION OF THE DRAWINGS

Referring now to the attached drawings which form a part of this original disclosure.

DETAILED DESCRIPTION OF EMBODIMENTS

An air conditioning apparatus according to a preferred embodiment of the present invention will be hereinafter explained on the basis of the attached drawings. It should be noted that a specific construction of the air conditioning apparatus according to the present invention is not limited to the following preferred embodiment and the modifications thereof, and can be changed without departing from the scope of the present invention.

(1) Basic Construction of Air Conditioning Apparatus

Figure 1:
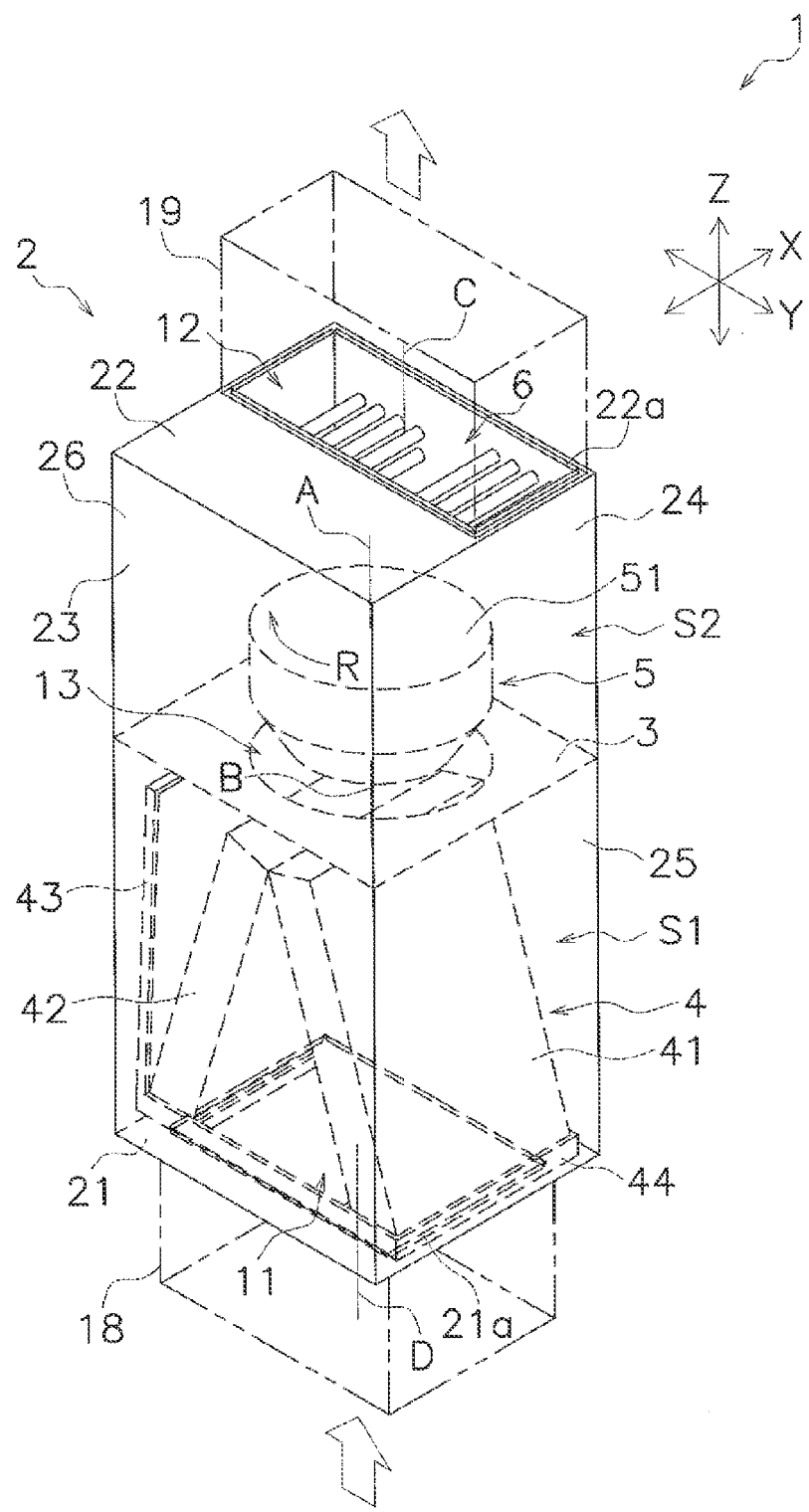
FIG. 1 is an external perspective view of an air conditioning apparatus according to a preferred embodiment of the present invention (in a vertical mount configuration)
Figure 2:
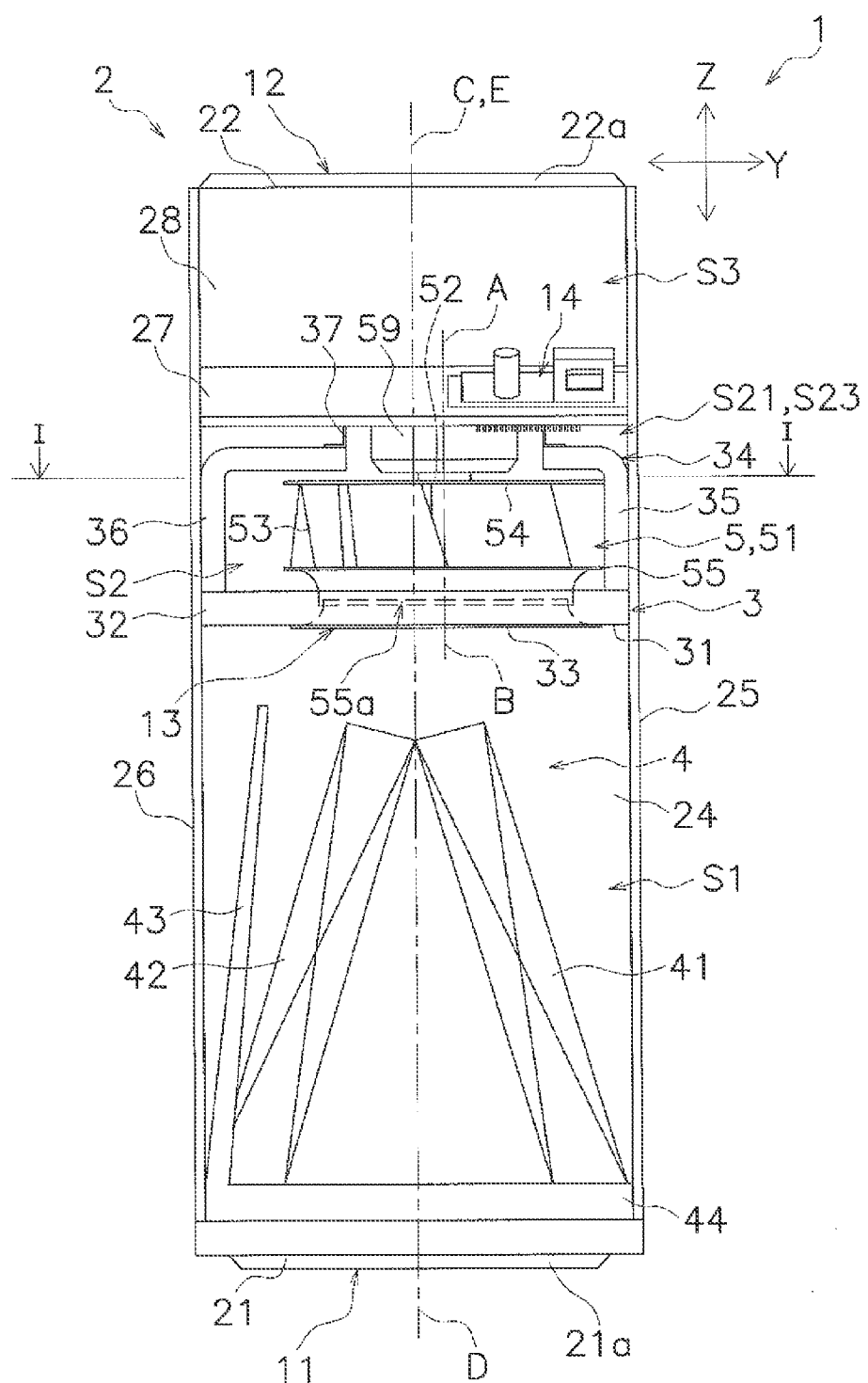
FIG. 2 is a front lateral view of the air conditioning apparatus from which a first lateral part is detached (in the vertical mount configuration)
Figure 3:
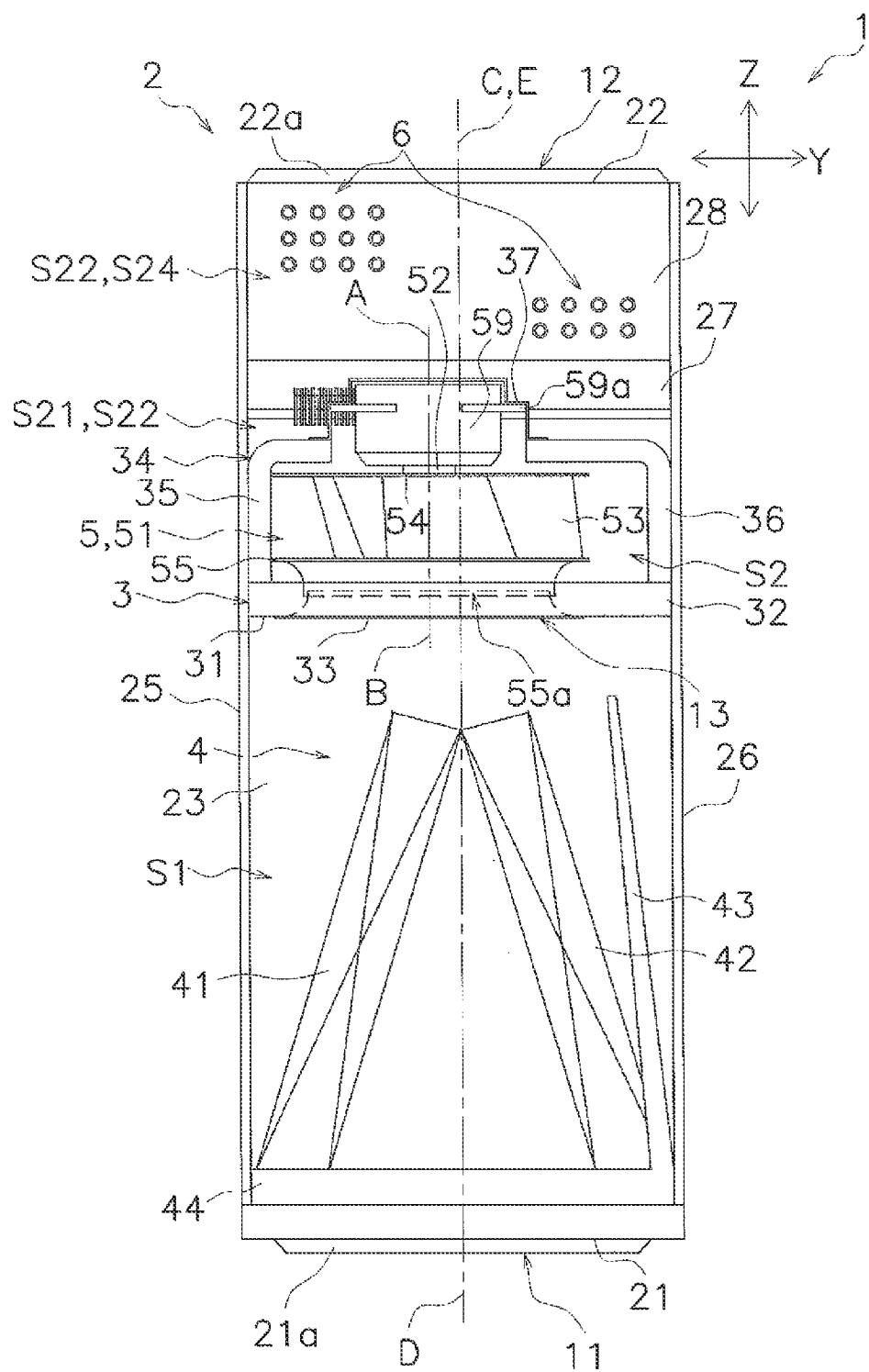
FIG. 3 is a rear lateral view of the air conditioning apparatus from which a second lateral part is detached (in the vertical mount configuration)
Figure 4:
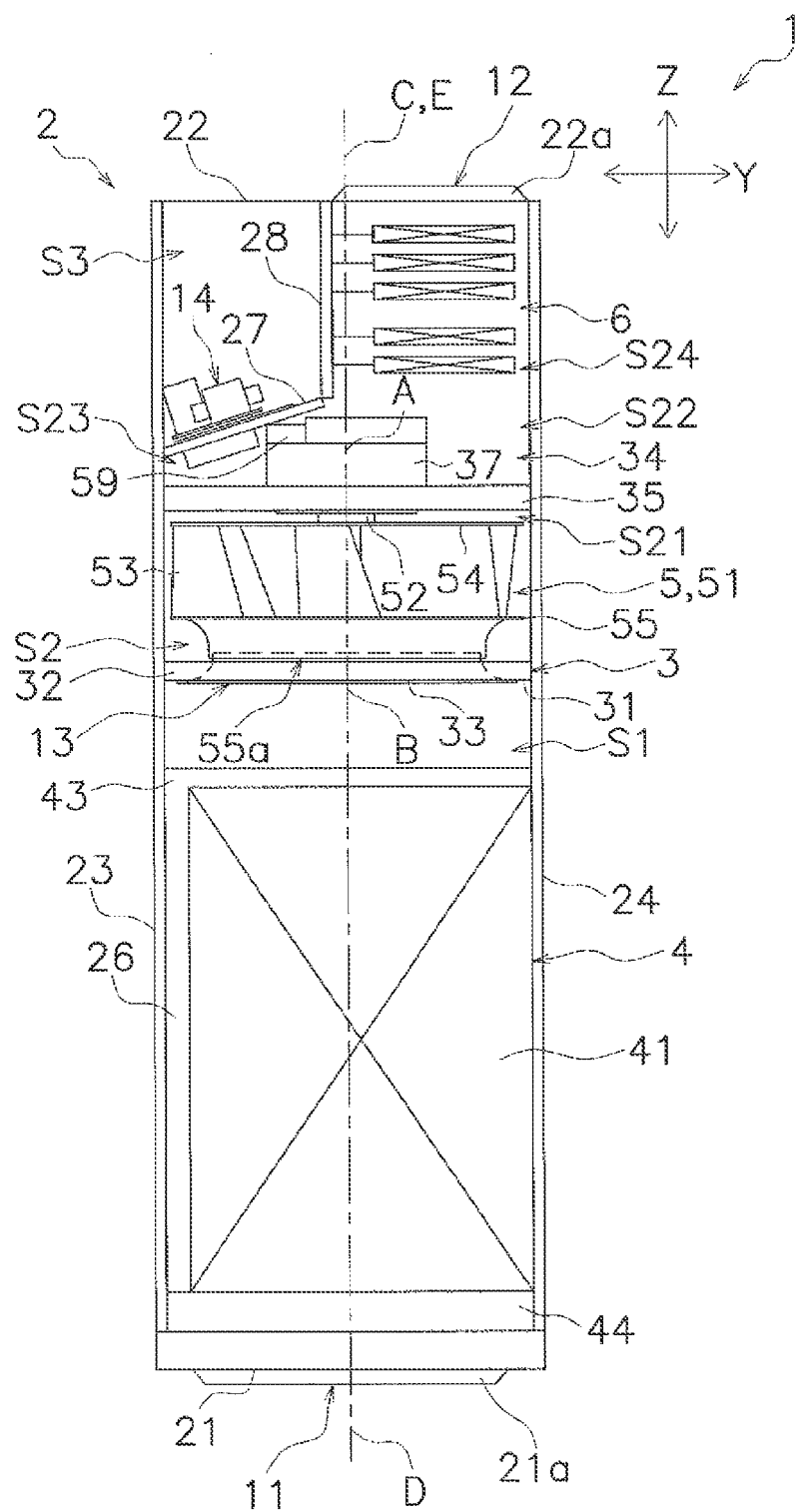
FIG. 4 is a right lateral view of the air conditioning apparatus from which a third lateral part is detached (in the vertical mount configuration)
Figure 5:
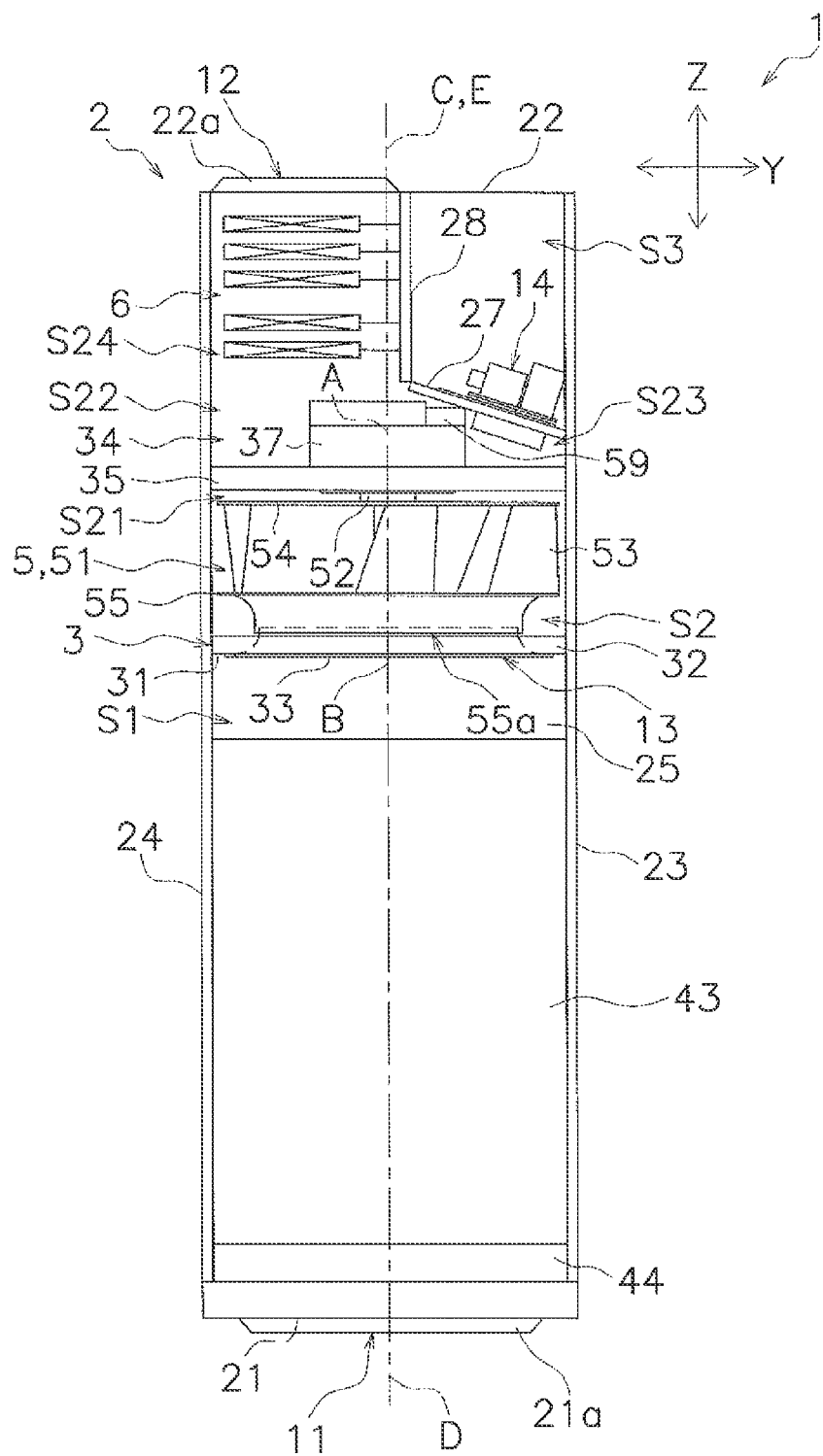
FIG. 5 is a left lateral view of the air conditioning apparatus from which a fourth lateral part is detached (in the vertical mount configuration)
Figure 6:
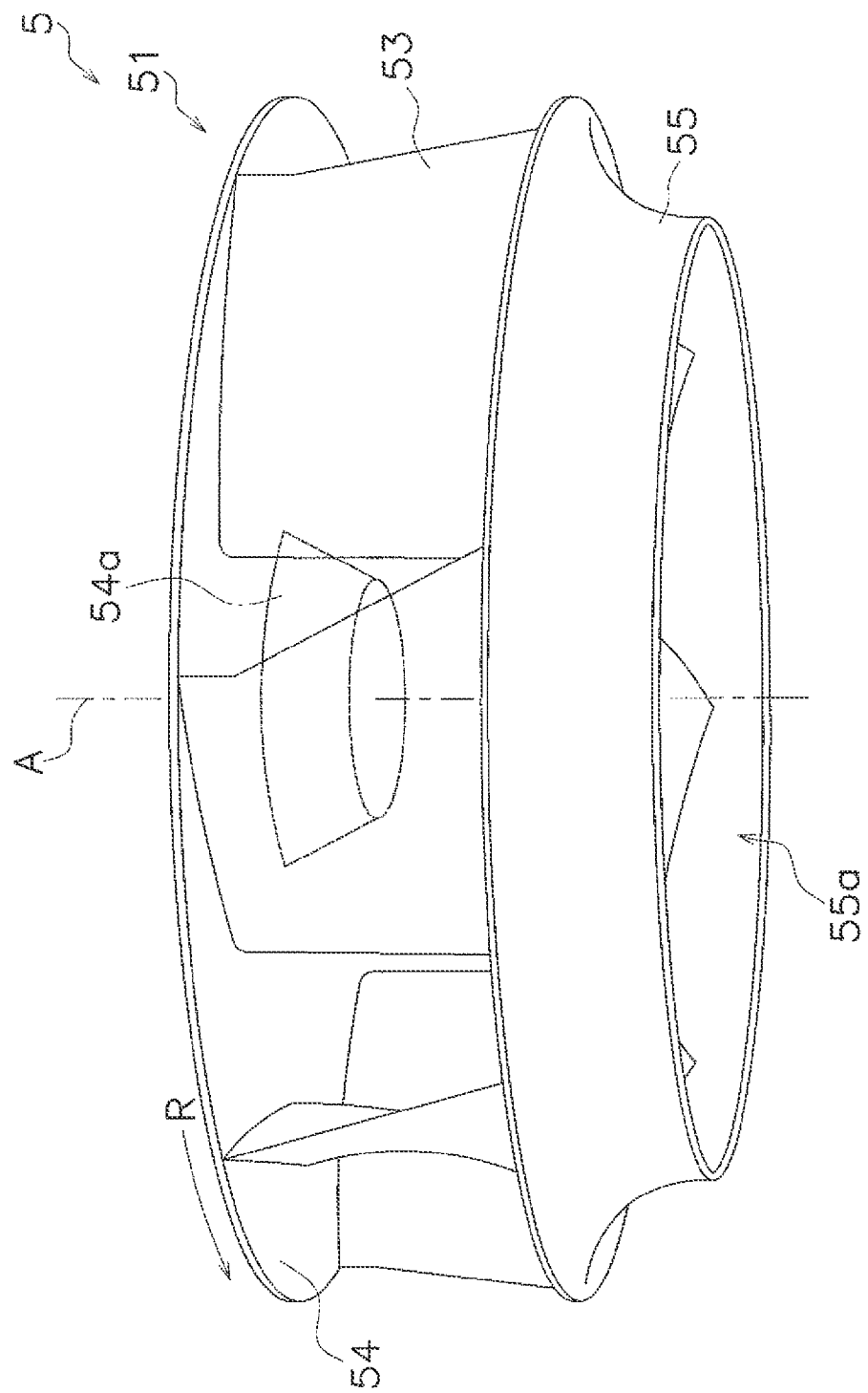
FIG. 6 is an external perspective view of a bladed wheel of a centrifugal fan.
Figure 7:
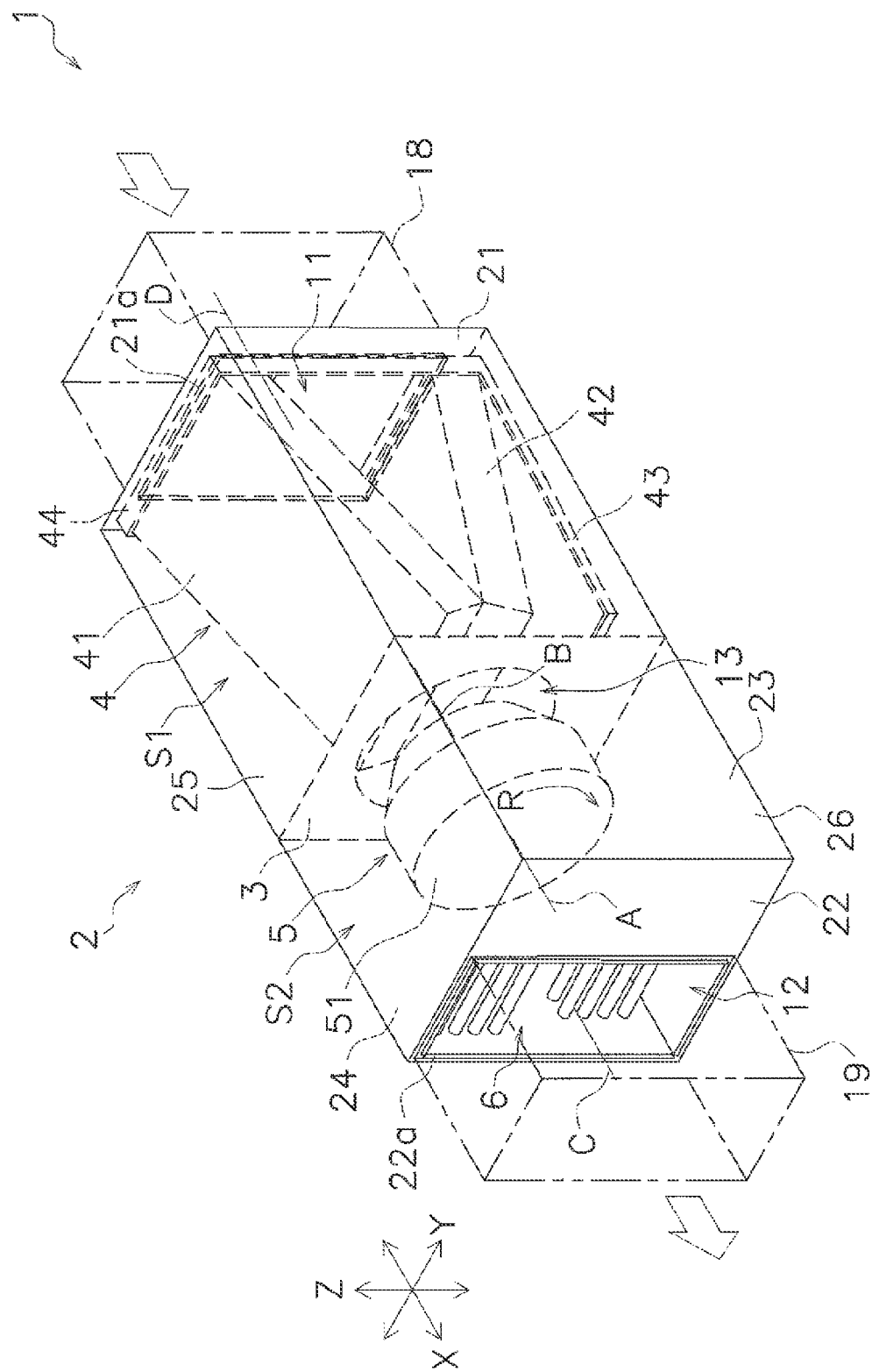
FIG. 7 is an external perspective view of the air conditioning apparatus (in a horizontal mount configuration)
Figure 8:
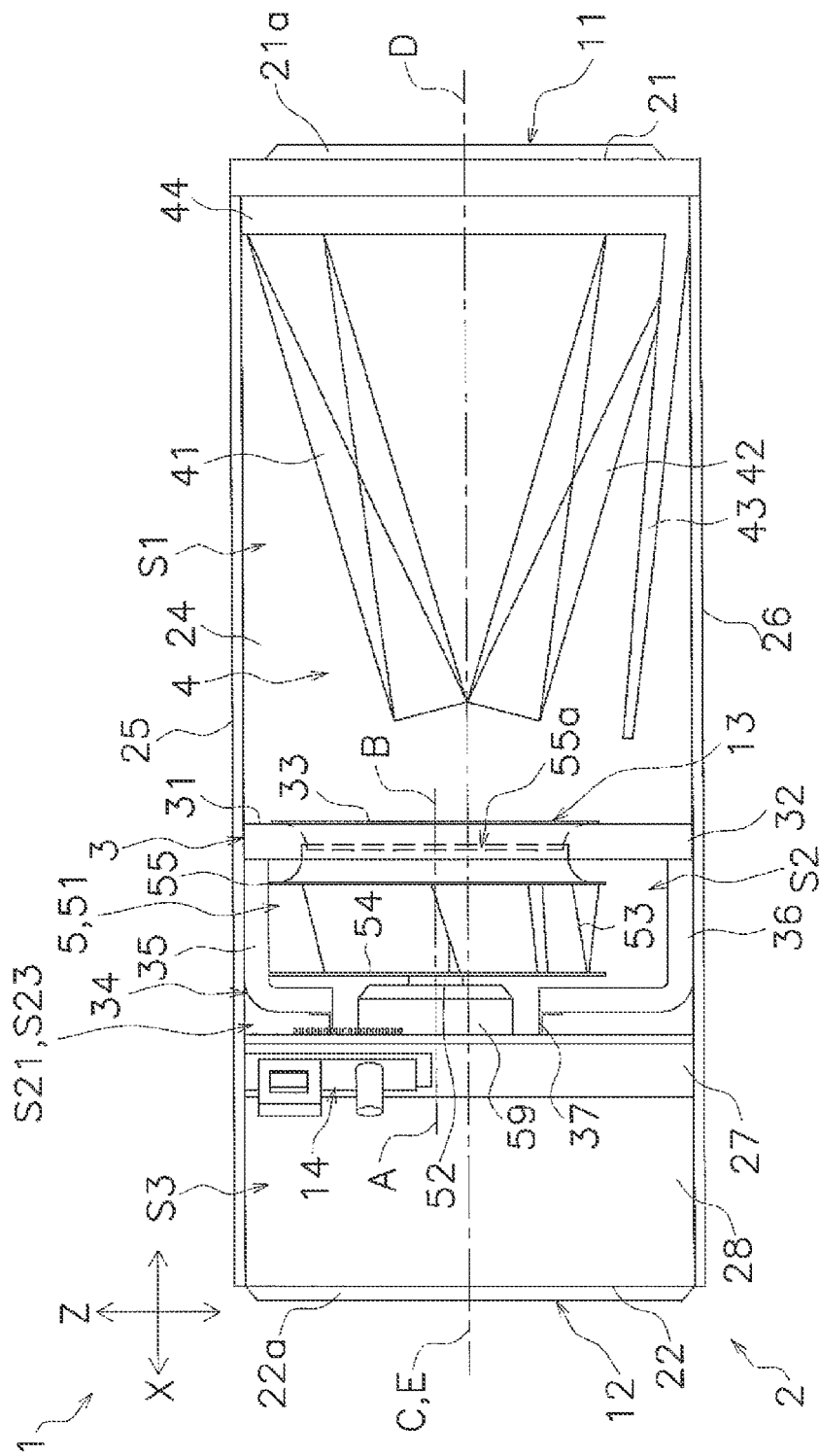
FIG. 8 is a right lateral view of the air conditioning apparatus from which the first lateral part is detached (in the horizontal mount configuration)

First, a basic construction of an air conditioning apparatus 1 will be explained with FIGS. 1 to 8. Here, FIG. 1 is an external perspective view of the air conditioning apparatus 1 according to the preferred embodiment of the present invention (in a vertical mount configuration). FIG. 2 is a front lateral view of the air conditioning apparatus 1 from which a first lateral part 23 is detached (in the vertical mount configuration). FIG. 3 is a rear lateral view of the air conditioning apparatus 1 from which a second lateral part 24 is detached (in the vertical mount configuration). FIG. 4 is a right lateral view of the air conditioning apparatus 1 from which a third lateral part 25 is detached (in the vertical mount configuration). FIG. 5 is a left lateral view of the air conditioning apparatus 1 from which a fourth lateral part 26 is detached (in the vertical mount configuration). FIG. 6 is an external perspective view of a bladed wheel of a centrifugal fan. FIG. 7 is an external perspective view of the air conditioning apparatus 1 (in a horizontal mount configuration). FIG. 8 is a right lateral view of the air conditioning apparatus 1 from which the first lateral part 23 is detached (in the horizontal mount configuration).

The air conditioning apparatus 1 is an apparatus installed in a building in order to perform a cooling operation and a heating operation for the indoor space of the building. The air conditioning apparatus 1 includes a casing 2, a partition member 3, a heat exchanger 4 and a centrifugal fan 5. The casing 2 has an intake port 11 and a blow-out port 12. The partition member 3 divides the interior of the casing 2 into a heat exchanger compartment S1 located on the intake port 11 side and a fan compartment S2 located on the blow-out port 12 side, and has a fan entrance 13 making the heat exchanger compartment S1 and the fan compartment S2 communicate with each other. The heat exchanger 4 is mounted in the heat exchanger compartment S1. The centrifugal fan 5 includes a bladed wheel 51 having a plurality of rearward blades 53 and is configured to suck air existing in the heat exchanger compartment S1 into the fan compartment S2 through the fan entrance 13, with the bladed wheel 51 being mounted in the fan compartment S2 such that a rotary shaft 52 (its axis will be ref to as a rotary axis A) is oriented to an opening direction B of the fan entrance 13.

Moreover, the fan entrance 13 is herein opposed to the blow-out port 12, and the rotary shaft 52 (the rotary axis A) of the bladed wheel 51 is oriented to the opening direction B of the fan entrance 13 and an opening direction C of the blow-out port 12. Furthermore, the intake port 11 is herein opposed to the fan entrance 13, and the rotary shaft 52 (the rotary axis A) of the bladed wheel 51 is oriented to the opening direction B of the fan entrance 13, the opening direction C of the blow-out port 12 and an opening direction D of the intake port 11.

Moreover, the air conditioning apparatus 1 is herein capable of taking two configurations, i.e., the vertical mount configuration and the horizontal mount configuration. In the vertical mount configuration, the casing 2 is disposed such that the rotary shaft 52 (the rotary axis A) of the bladed wheel 51 is oriented to a vertical direction Z (see FIGS. 1 to 5). In the horizontal mount configuration, the casing 2 is disposed such that the rotary shaft 52 (the rotary axis A) of the bladed wheel 51 is oriented to a horizontal direction X (see FIGS. 7 and 8).

As described above, the casing 2 has the intake port 11 and the blow-out port 12. The casing 2 is mainly composed of an upstream lateral part 21, a downstream lateral part 22, the first lateral part 23, the second lateral part 24, the third lateral part 25 and the fourth lateral part 26. These lateral parts 21 to 26 form the elongated cuboid casing 2. The upstream lateral part 21 is a member configured to form the bottom lateral surface of the casing 2 in the vertical mount configuration and form the rear lateral surface of the casing 2 in the horizontal mount configuration, The downstream lateral part 22 is a member configured to firm the top lateral surface of the casing 2 in the vertical mount configuration and form the front lateral surface of the casing 2 in the horizontal mount configuration. The upstream lateral part 21 and the downstream lateral part 22 are disposed away from each other in the lengthwise direction of the casing 2 (i.e., a direction along the rotary axis A and the opening directions B, C and D. The upstream lateral part 21 has the intake port 11. The intake port 11 is an opening bored in the middle of the upstream lateral part 21 and is made in the form of a rectangular aperture. The downstream lateral part 22 has the blow-out port 12. The blow-out port 12 is an opening bored in the downstream lateral part 22 so as to be displaced from the middle of the downstream lateral part 22, and is made in the form of a rectangular aperture. The blow-out port 12 is herein located in a position close to the second lateral part 24 within the downstream lateral part 22. The first lateral part 23 is a member configured to form the front lateral surface of the casing 2 in the vertical mount configuration and form the right lateral surface of the casing 2 in the horizontal mount configuration. The second lateral part 24 is a member configured to form the rear lateral surface of the casing 2 in the vertical mount configuration and form the left lateral surface of the casing 2 in the horizontal mount configuration. The first lateral part 23 and the second lateral part 24 are disposed away from each other in a direction orthogonal to the lengthwise direction of the casing 2 (i.e., the horizontal direction X orthogonal to the rotary axis A and the opening directions B, C and D in the vertical mount configuration; a right-and-left direction Y orthogonal to the rotary axis A and the opening directions B, C and D in the horizontal mount configuration). The third lateral part 25 is a member configured to form the right lateral surface of the casing 2 in the vertical mount configuration and form the top lateral surface of the casing 2 in the horizontal mount configuration. The fourth lateral part 26 is a member configured to form the left lateral surface of the casing 2 in the vertical mount configuration and form the bottom lateral surface of the casing 2 in the horizontal mount configuration. The third lateral part 25 and the fourth lateral part 26 are disposed away from each other in a direction orthogonal to the lengthwise direction of the casing 2 (i.e., the right-and-left direction Y orthogonal to the rotary axis A and the opening directions B and C in the vertical mount configuration; the vertical direction Z orthogonal to the rotary axis A and the opening directions B, C and D in the horizontal mount configuration).

Moreover, a plurality of ridges 21a are herein formed on the upstream lateral part 21 so as to enclose the circumferential edges of the intake port 11, whereas a plurality of ridges 22a are formed on the downstream lateral part 22 so as to enclose the circumferential edges of the blow-out port 12. Furthermore, an intake duct 18 is connected to the intake port 11 through the ridges 21a, whereas a blowout duct 19 is connected to the blow-out port 12 through the ridges 22a. With the construction, the air conditioning apparatus 1 is herein configured to be of a duct connection type for sucking and blowing air from and to an air-conditioned room indirectly through the ducts 18 and 19. It should be herein noted that the intake port 11 and the blow-out port 12 are made in forms of rectangular apertures, and likewise, the ducts 18 and 19 are made in thrills of rectangular tubes. However, the ports 11 and 12 and the ducts 18 and 19 are not limited to be made in the aforementioned forms, and may employ a variety of forms. Furthermore, the air conditioning apparatus 1 is not limited to be of the duct connection type, and may be of a variety of types such as a type for sucking and blowing air from and to an air-conditioned room directly through the intake port 11 and the blow-out port 12.

As described above, the partition member 3 divides the interior of the casing 2 into the heat exchanger compartment S1 located on the intake port 11 side and the fan compartment S2 located on the blow-out port 12 side, and has the fan entrance 13 that makes the heat exchanger compartment S1 and the fan compartment S2 communicate with each other. The partition member 3 is mainly composed of a partition body 31 made in the form of a rectangular plate. The partition body 31 is disposed in parallel to a direction orthogonal to the lengthwise direction of the casing 2 (i.e., a direction orthogonal to the rotary axis A and the opening directions B, C and D). The fan entrance 13 is bored in the partition body 31 and is herein made in the form of a circular aperture. The partition body 31 has a partition circumferential part 32 made in the form of a rectangular frame. The partition circumferential part 32 extends from the circumferential edges of the partition body 31 toward the fan compartment S2 along the inner surfaces of the lateral parts 23 to 26 of the casing 2.

As described above, the heat exchanger 4 is mounted in the heat exchanger compartment S1. In a cooling operation, the heat exchanger 4 is configured to cool air flowing through the heat exchanger compartment S1 by a refrigerant. Contrarily in a heating operation, the heat exchanger 4 is also capable of heating air flowing through the heat exchanger compartment S1 by the refrigerant. A fin tube heat exchanger, composed of multiple fins and a heat transfer tube, is herein employed as the heat exchanger 4. Furthermore, the refrigerant is configured to be supplied to the heat exchanger 4 from an outdoor unit installed outside the building or so forth. The heat exchanger 4 is composed of a part 41 located closely to the third lateral part 25 of the casing 2 and a part 42 located closely to the fourth lateral part 26 of the casing 2. Moreover, the part 41 of the heat exchanger 4, located closely to the third lateral part 25, is disposed in a tilt position so as to get closer to the third lateral part 25 from a side near to the fan entrance 13 to a side near to the intake port 11. The part 42 of the heat exchanger 4, located closely to the fourth lateral part 26, is disposed in a tilt position so as to get closer to the fourth lateral part 26 from the side near to the fan entrance 13 to the side near to the intake port 11. With the construction, the heat exchanger 4 has a V shape so as to get closer to the third lateral part 25 and the fourth lateral part 26 of the casing 2 from the side near to the fan entrance 13 to the side near to the intake port 11. It should be noted that the heat exchanger 4 is not limited to have the V shape, and may employ a variety of shapes.

Moreover, drain pans 43 and 44 are mounted in the heat exchanger compartment S1 in order to receive water produced by dew condensation in the heat exchanger 4. The first drain pan 43 is configured to be used when the casing 2 is disposed such that the rotary shaft 52 (the rotary axis A) of the bladed wheel 51 is oriented to the horizontal direction X (in the horizontal mount configuration). The second drain pan 44 is configured to be used when the casing 2 is disposed such that the rotary shaft 52 (the rotary axis A) of the bladed wheel 51 is oriented to the vertical direction Z (in the vertical mount configuration). The first drain pan 43 is disposed in a position close to the fourth lateral part 26, which is one of the lateral parts 23 to 26 of the casing 2 that are disposed along the opening direction B of the fan entrance 13. With the construction, the first drain pan 43 is configured to be disposed over the fourth lateral part 26 forming the bottom lateral surface of the casing 2 and receive the bottom side of the heat exchanger 4 in the horizontal mount configuration. The second drain pan 44 is disposed in a position close to the upstream lateral part 21, which is one of the lateral parts 21 and 22 of the casing 2 that are disposed along the direction orthogonal to the opening direction B of the fan entrance 13. With the construction, the second drain pan 44 is configured to be disposed over the upstream lateral part 21 forming the bottom lateral surface of the casing 2 and receive the bottom side of the heat exchanger 4 in the vertical mount configuration. Furthermore, the first and second drain pans 43 and 44 are herein compatible with the vertical mount configuration and the horizontal mount configuration, but the first drain pan 43 to be used in the horizontal mount configuration exists in the heat exchanger compartment S1 even in the vertical mount configuration, whereas the second drain pan 44 to be used in the vertical mount configuration exists in the heat exchanger compartment S1 even in the horizontal mount configuration.

As described above, the centrifugal fan 5 includes the bladed wheel 51 having the plural rearward blades 53 and is configured to suck air existing in the heat exchanger compartment S1 into the fan compartment S2 through the fan entrance 13, with the bladed wheel 51 being mounted in the fan compartment S2 such that the rotary shaft 52 (the rotary axis A) is oriented to the opening direction B of the fan entrance 13. Furthermore, a fan motor 59 is mounted in the fan compartment S2 in order to drive and rotate the bladed wheel 51. Here in the fan compartment 2, the bladed wheel 51 is disposed proximally to the fan entrance 13 and the fan motor 59 is disposed on the downwind side of the bladed wheel 51 along the rotary shaft 52 (the rotary axis A) of the bladed wheel 51. Moreover, a bell mouth 33 is mounted to the fan entrance 13. A space, located on the downwind side of the bladed wheel 51 in the fan compartment S2, is herein defined as a fan downwind space S21. Thus, the fan motor 59 is disposed in the fan downwind space S21.

The bladed wheel 51 is composed of a hub 54, a shroud 55 and the plural rearward blades 53 disposed between the hub 54 and the shroud 55. The hub 54 connects the Now-out port 12 side ends of the plural rearward blades 53, and is configured to be rotated about the rotary shaft 52 (the rotary axis A). The hub 54 is a disc-shaped member and has a hub protrusion 54a protruding from its middle toward the shroud 55. The hub protrusion 54a is coupled to the fan motor 59. The shroud 55 is disposed on the fan entrance 13 side of the hub 54 so as to be opposed to the hub 54, connects the fan entrance 13 side ends of the plural rearward blades 53, and is configured to be rotated about the rotary shaft 52 (the rotary axis A). The shroud 55 is an annular member and has a fan opening 55a that is bored in the form of a circular aperture and is centered at the rotary shaft 52 (the rotary axis A). The shroud 55 has a curved shape that its outer diameter increases toward a side near to the hub 54. The plural rearward blades 53 are disposed between the hub 54 and the shroud 55 so as to be aligned at predetermined intervals along the circumferential direction of the rotary shaft 52 (the rotary axis A). Each rearward blade 53 tilts oppositely to a rotary direction R of the bladed wheel 51 (herein a clockwise direction in a view seen from the blow-out port 12 side) with respect to the radial direction of the hub 54.

The bell mouth 33 is mounted to the fan entrance 13 of the partition member 3 so as to be opposed to the fan opening 55a of the bladed wheel 51 and directs air, flowing thereto from the heat exchanger compartment S1, to the fan opening 55a of the bladed wheel 51. The bell mouth 33 is an annular member centered at the rotary shaft 52 (the rotary axis A). The bell mouth 33 has a curved shape that its outer diameter decreases toward a side near to the shroud 55.

The fan motor 59 is disposed concentrically to the rotary shaft 52 (the rotary axis A) of the bladed wheel 51 in the tart downwind space S21. The fan motor 59 has a columnar shape centered at the rotary shaft 52 (the rotary axis A). The fan motor 59 is herein fixed to the partition member 3 through a motor support base 34. Specifically, the motor support base 34 is composed of support frames 35 and 36 forming a roughly squared U shape. The support frames 35 and 36 respectively extend toward the vicinity of the outer peripheral surface of the fan motor 59 from parts of the partition circumferential part 32 of the partition member 3, i.e., a part located closely to the third lateral part 25 of the casing 2 and a part located closely to the fourth lateral part 26 of the casing 2. Moreover, the fan motor 59 is fixed at its end plate parts 59a to the support frames 35 and 36 through a bracket 37. The end plate parts 59a extend from the outer peripheral surface of the fan motor 59 toward the third lateral part 25 and the fourth lateral part 26. Thus, the centrifugal fan 5, including the bladed wheel 51 and the fan motor 59, is designed to be fixed to the partition member 3 through the motor support base 34. With the construction, the entirely of the centrifugal fan 5 is configured to be detachable by detaching the partition member 3 from the casing 2 in performing a maintenance work or so forth.

Moreover, the fan downwind space S21 of the fan compartment S2 has a blow-out port opposed space S22 as a region opposed to the blow-out port 12. The blow-out port 12 is herein disposed in the position close to the second lateral part 24 within the downstream lateral part 22. Thus, when the casing 2 is seen from the blow-out port 12 side, the blow-out port opposed space S22 is formed by a space enclosed by parts located along the circumferential edges of the opening of the blow-out port 12, i.e., the second lateral part 24, a part of the third lateral part 25 that is located closely to the second lateral part 24, and a part of the fourth lateral part 26 that is located closely to the second lateral part 24. Furthermore, a blow-out port non-opposed surface part 27 is mounted in a position on the downwind side of the bladed wheel 51 so as to be opposed to the fan entrance 13, and accordingly, a blow-out port non-opposed space S23 is formed as a space excluding the blow-out port opposed space S22 within the fan downwind space S21 so as not to be opposed to the blow-out port 12 but to be opposed to the blow-out port non-opposed surface part 27. Moreover, a blow-out port circumferential surface part 28 is herein provided so as to extend from the blow-out port. 12 side end of the blow-out port non-opposed surface part 27 toward the blow-out port 12 along the opening direction B of the fan entrance 13 and the opening direction C of the blow-out port 12. With the construction, an electric component compartment S3 is herein formed by the blow-out port non-opposed surface part 27, the blow-out port circumferential surface part 28, the first lateral part 23, the third lateral part 25, the fourth lateral part 26, and a part of the downstream lateral part 22 that is located closely to the first lateral part 23 and in which the blow-out port 12 is not formed. The electric component compartment S3 accommodates electric components 14 to be used for controlling devices that make up the air conditioning apparatus 1. Furthermore, a blow-out pathway region S24, having the same opening size as the blow-out port 12, is formed by a region located closely to the blow-out port 12 within the blow-out port opposed space S22, i.e., a space enclosed by the blow-out port circumferential surface part 28, the second lateral part 24, a part of the third lateral part 25 that is located closely to the second lateral part 24, and a part of the fourth lateral part 26 that is located closely to the second lateral part 24.

Moreover, an electric heater 6 is herein mounted in the fan downwind space S21 of the fan compartment S2 in order to heat air blown out to the fan downwind space S21 by the bladed wheel 51 of the centrifugal fan 5. The electric heater 6 is heating means for heating air flowing through the fan compartment S2 in a heating operation. A heating element assembly with coiled electric heating wires is herein employed as the electric heater 6 (heating means). The electric heater 6 (the heating means) is disposed in the blow-out port opposed space S22, i.e., a region opposed to the blow-out port 12 within the fan downwind space S21. More specifically, the electric heater 6 (the heating means) is disposed in the blow-out pathway region S24 close to the blow-out port 12 within the blow-out port opposed space S22. It should be noted that the electric heater 6 (the heating means) is not limited to the heating element assembly with the coiled electric heating wires, and alternatively, may employ a variety of types of heater.

(2) Basic Action of Air Conditioning Apparatus

Next, a basic action of the air conditioning apparatus 1 will be explained with FIGS. 1 to 8.

In the air conditioning apparatus 1 having the aforementioned construction, the bladed wheel 51 of the centrifugal fan 5 is configured to be rotated by driving of the fan motor 59. This produces the flow of air passing through the interior of the casing 2 sequentially in the order of the intake port 11, the heat exchanger compartment S1, the fan entrance 13, the fan compartment S2 and the blow-out port 12.

Now in the cooling operation, air fed to the interior of the casing 2 through the intake port 11 flows into the heat exchanger compartment S1, and is cooled by the refrigerant flowing through the heat exchanger 4. Then, the air cooled by the heat exchanger 4 flows into the fan compartment S2 through the fan entrance 13 and is sucked into the bladed wheel 51 of the centrifugal fan 5. The air sucked into the bladed wheel 51 is blown out to the fan downwind space S21 located on the downwind side of the bladed wheel 51. The air blown out to the fan downwind space S21 is fed to the outside of the casing 2 through the blow-out port 12.

On the other hand, in the heating operation, air fed to the interior of the casing 2 through the intake port 11 flows into the heat exchanger compartment S1, and is heated by the refrigerant flowing through the heat exchanger 4. The air heated by the heat exchanger 4 flows into the fan compartment S2 through the fan entrance 13, and is sucked into the bladed wheel 51 of the centrifugal fan 5. The air sucked into the bladed wheel 51 is blown out to the fan downwind space S21 located on the downwind side of the bladed wheel 51. The air blown out to the fan downwind space S21 is further heated by the electric heater 6 (the heating means), and is then fed to the outside of the casing 2 through the blow-out port 12.

(3) Construction for Enhancing Ventilation Performance of Centrifugal Fan

In the air conditioning apparatus 1 having the aforementioned construction, the centrifugal fan 5 having the rearward blades 53 is mounted in the fan compartment S2 having the fan entrance 13 bored in opposition to the blow-out port 12 such that the rotary shaft 52 (the rotary axis A) is oriented to the opening direction B of the fan entrance 13 and the opening direction C of the blow-out port 12.

Figure 9:
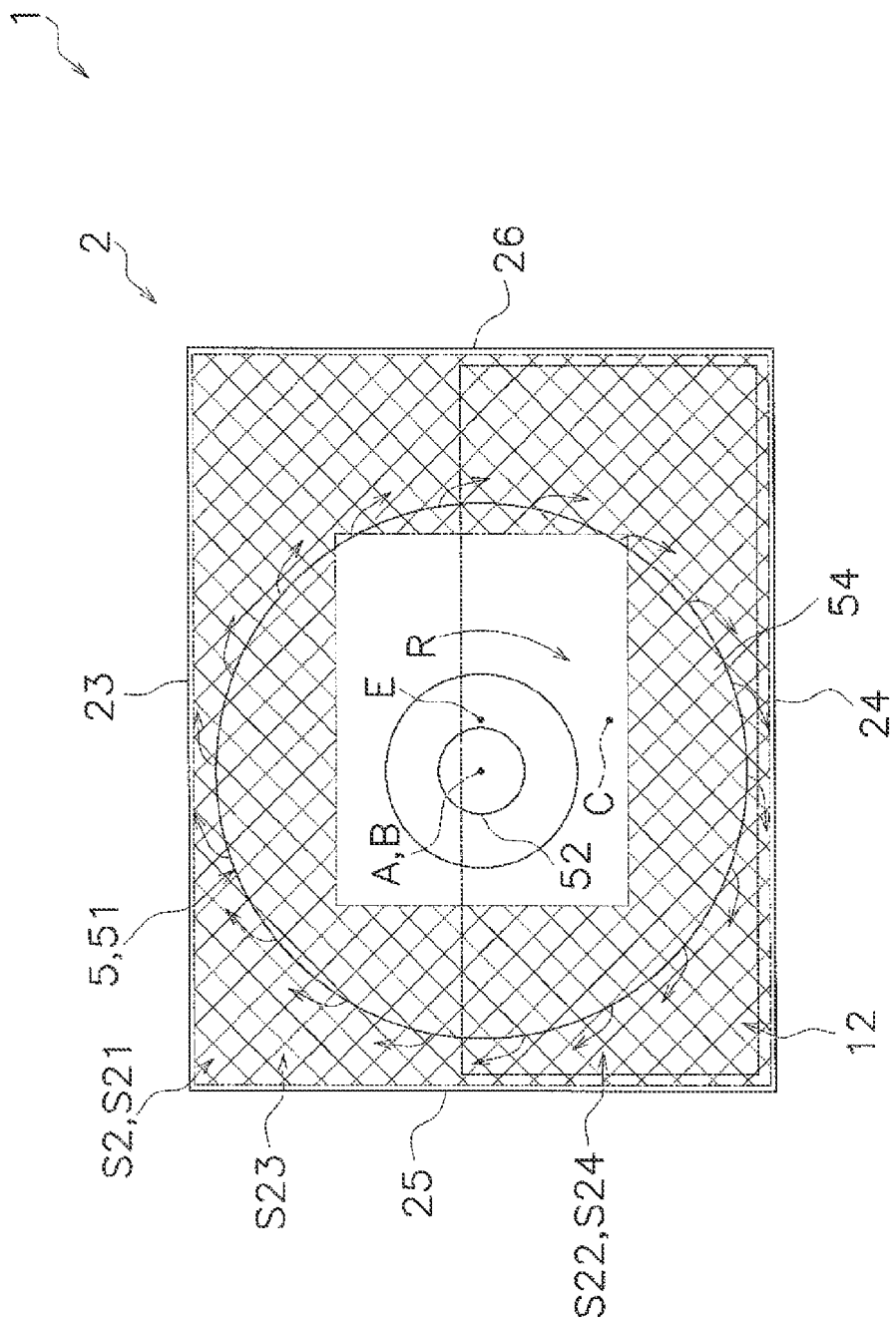
FIG. 9 is a cross-sectional view of FIG. 2 taken along line I-I.
Figure 10:
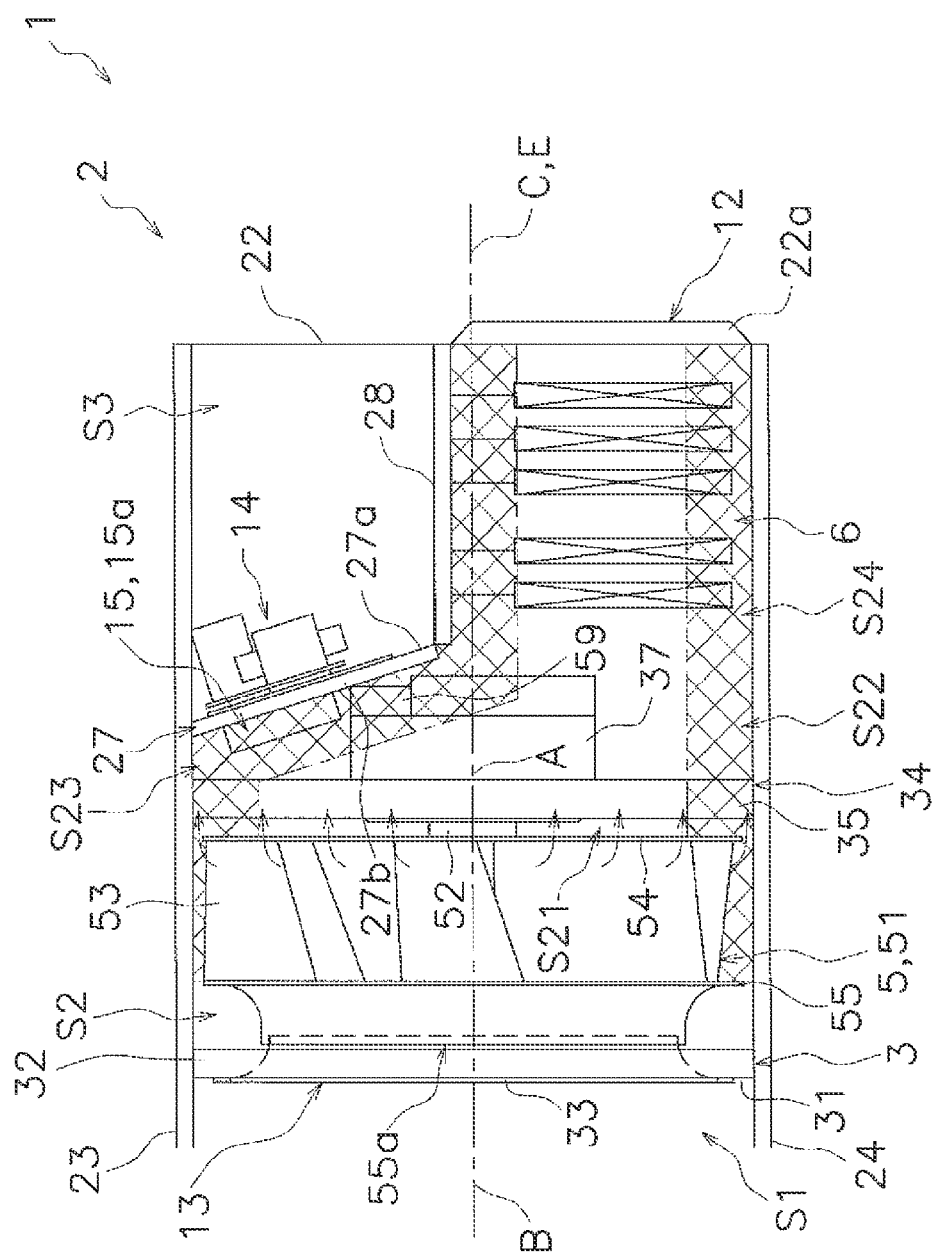
FIG. 10 is an enlarged view of a fan compartment and its vicinity in FIG. 4.

Air blown out by the bladed wheel 51 of the centrifugal fan 5 herein tends to swirl in the rotary direction R of the bladed wheel 51 and simultaneously flow along the lateral parts 23 to 26 of the casing 2 when the casing 2 is seen from the direction along the rotary shaft 52 (the rotary axis A) of the centrifugal fan 5 (i.e., the opening direction B of the fan entrance 13 and the opening direction C of the blow-out port 12) (see FIGS. 9 and 10). FIG. 9 is herein a cross-sectional view of FIG. 2 taken along line I-I. FIG. 10 is an enlarged view of the fan compartment S2 and its vicinity in FIG. 4. Additionally in FIGS. 9 and 10, arrows indicate the flow of air blown out from the bladed wheel 51, whereas cross hatching indicates regions in which air flows at a high speed.

Therefore, the air conditioning apparatus 1 is demanded to enhance the ventilation performance of the centrifugal fan 5 in consideration of the aforementioned flow tendency of air from the centrifugal fan 5.

In view of the above, the bladed wheel 51 and the blow-out port 12 are herein contrived in their positional arrangements. Specifically, the bladed wheel 51 is disposed such that the rotary shaft 52 (the rotary axis A) is disposed in a position close to the third lateral part 25 (a bladed wheel nearby lateral part), which is one of the lateral parts 23 to 26 of the casing 2 that are disposed along the opening direction B of the fan entrance 13 and the opening direction C of the blow-out port 12 (see FIGS. 2, 3, 8 and 9). Put differently, the bladed wheel 51 is herein disposed such that the rotary shaft 52 (the rotary axis A) is displaced closely to the third lateral part 25 (the bladed wheel nearby lateral part) from a halfway line E between the third lateral part 25 and the fourth lateral part 26. Moreover, the rotary shaft 52 (the rotary axis A) of the bladed wheel 51 is disposed in a position close to the third lateral part 25 (the bladed wheel nearby lateral part), and hence, the fan entrance 13 and the bell mouth 33 are also designed to be disposed in a position close to the third lateral part 25 (the bladed wheel nearby lateral part) within the partition member 3. Additionally, a part of the blow-out port 12 (a right part of the blow-out port 12 in FIG. 9) is disposed in a position close to the fourth lateral part 26 (a blow-out port nearby lateral part) that is one of the lateral parts of the casing 2 and is opposed to the third lateral part 25 (the bladed wheel nearby lateral part) (see FIGS. 1, 4, 5, 7 and 10). Put differently, the blow-out port 12 is herein disposed in the downstream lateral part 22 so as to be displaced closely to the second lateral part 24, and accordingly, a part of the blow-out port 12 (i.e., the tight part of the blow-out port 12 in FIG. 9) is disposed in a position close to the fourth lateral part 26 (the blow-out port nearby lateral part) opposed to the third lateral part 25 (the bladed wheel nearby lateral part).

Figure 11:
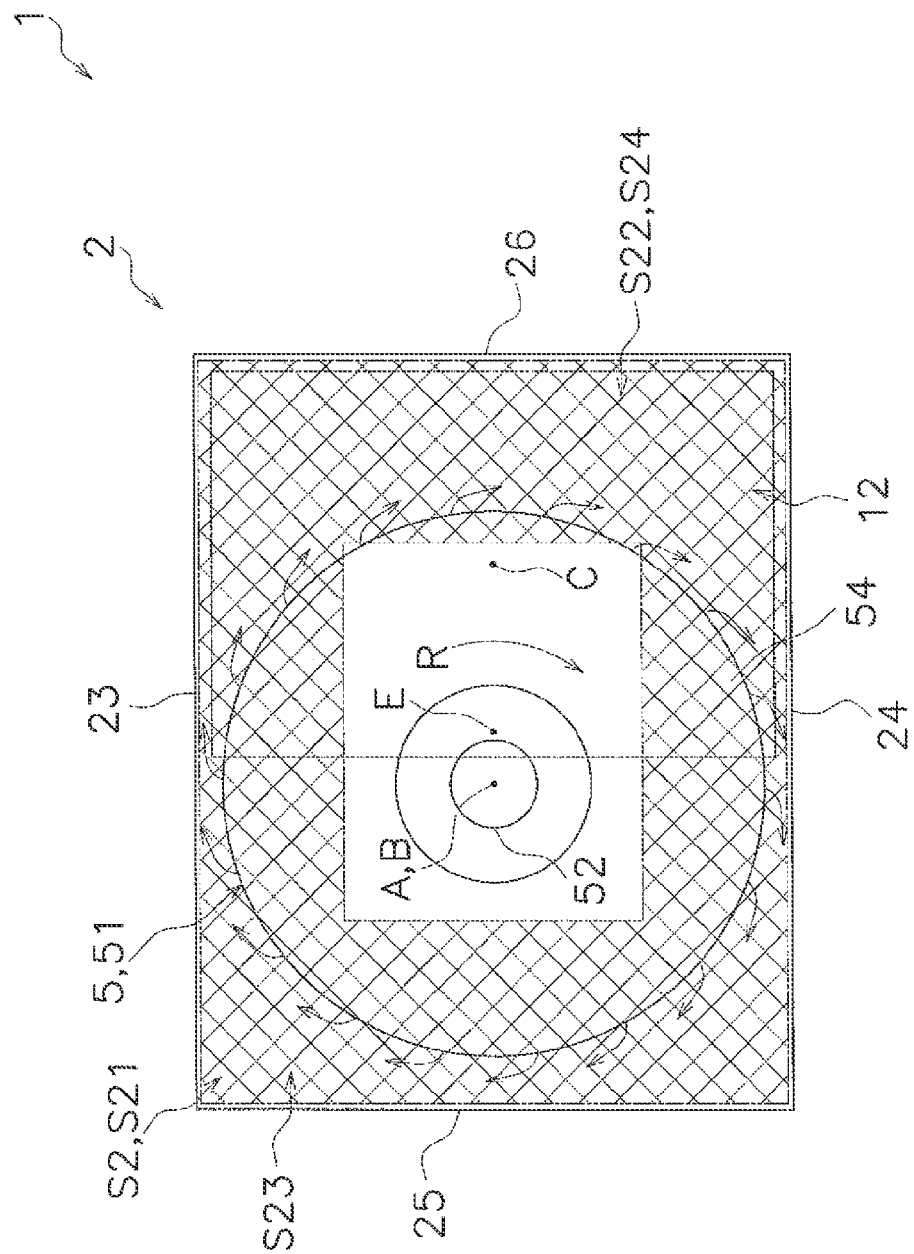
FIG. 11 is a diagram corresponding to FIG. 9 and shows a construction that a blow-out port is entirely located closely to a blow-out port nearby lateral part.

It should be herein noted that the rotary shaft 52 (the rotary axis A) of the bladed wheel 51 is disposed in a position close to the third lateral part 25, and a part of the blow-out port 12 is disposed in a position close to the fourth lateral part 26. However, the positional arrangements of the rotary shaft 52 and the blow-out port 12 are not limited to the above. For example, the rotary shaft 52 (the rotary axis A) of the bladed wheel 51 may be disposed in a position close to another lateral part of the casing 2 such as the fourth lateral part 26, and a part of the blow-out port 12 may be disposed in a position close to yet another lateral part of the casing 2 such as the third lateral part 25. Furthermore, a part of the blow-out port 12 (the right part of the blowout port 12 in FIG. 9) is herein disposed in a position close to the fourth lateral part 26. However, the positional arrangement of the blow-out port 12 is not limited to the above. For example, as shown in FIG. 11, the entirety of the blow-out port 12 may be disposed in a position close to the fourth lateral part 26 (the blow-out port nearby lateral part) opposed to the third lateral part 25 (the bladed wheel nearby lateral part). Put differently, the blow-out port 12 is only required to be at least partially disposed in a position close to the fourth lateral part 26 (the blow-out port nearby lateral part) opposed to the third lateral part 25 (the bladed wheel nearby lateral part).

Thus, the rotary shaft 52 (the rotary axis A) of the bladed wheel 51 is herein designed to be disposed closely to the bladed wheel nearby lateral part, and the blow-out port 12 is designed to be at least partially disposed closely to the blow-out port nearby lateral part opposed to the bladed wheel nearby lateral part. With the construction, air blown out by the bladed wheel 51 of the centrifugal fan 5 can be herein smoothly directed to the blow-out port 12 without changing its swirling flow tendency and its flow tendency along the lateral parts 23 to 26 of the casing 2 as much as possible.

Consequently, the ventilation performance of the centrifugal fan 5 can be herein more enhanced than a well-known configuration for directing air blown out by the bladed wheel of the centrifugal fan to flow closely to the middle of the casing.

(4) Construction for Enabling Efficient Cooling of Electric Components

The air conditioning apparatus 1 having the aforementioned construction is required to cool exothermic components such as a power element and a reactor among the electric components 14.

At this time, a construction utilizing the flow of air blown out by the centrifugal fan 5 can be assumed to be employed as a construction for cooling the electric components 14.

As described above, air blown out by the bladed wheel 51 of the centrifugal fan 5 herein tends to swirl in the rotary direction R of the bladed wheel 51 and simultaneously flow along the lateral parts 23 to 26 of the casing 2 when the casing 2 is seen from the direction along the rotary shaft 52 (the rotary axis A) of the centrifugal fan 5 (i.e., the opening direction B of the fan entrance 13 and the opening direction C of the blow-out port 12) (see FIGS. 9 and 10).

Therefore, the air conditioning apparatus 1 is demanded to enable efficient cooling of the electric components 14 in consideration of the aforementioned flow tendency of air from the centrifugal fan 5.

In view of the above, as the construction for cooling the electric components 14, a construction is herein employed that a heat sink 15 is mounted in the fan downwind space S21 so as to thermally make contact with the electric components 14, and the heat sink 15 is contrived in positional arrangement.

Specifically first, the heat sink 15 for cooling the electric components 14 is mounted in the blow-out port non-opposed space S23, which is a region not opposed to the blow-out port 12 within the fan downwind space S21 located on the downwind side of the bladed wheel 51 within the fan compartment S2 (see FIG. 10). The electric component 14 is herein mounted to a surface 27*a* that is one surface of the blow-out port non-opposed surface part 27 and is located on the electric component compartment S3 side, whereas the heat sink 15 is mounted to a surface 27*b* that is the other opposite surface of the blow-out port non-opposed surface part 27 and is located on the blow-out port non-opposed space S23 side.

Thus, when herein disposed in the fan downwind space S21, the heat sink 15 is designed to be disposed in the blow-out port non-opposed space S23. With the construction, the heat sink 15 can be herein disposed so as not to be adjacent to the blow-out port 12.

Consequently, degradation in ventilation performance of the centrifugal fan 5 can be herein inhibited as much as possible, and the heat sink 15 can be disposed in the fan downwind space S21.

Additionally, the blow-out port non-opposed surface part 27 herein forms a slope 27*b* slanting so as to be gradually away from the bladed wheel 51 in a direction from a side near to the fan entrance 13 to a side near to the blow-out port 12, and the heat sink 15 is disposed on the slope 27*b* (see FIG. 10). Furthermore, a plurality of fins 15*a* formed in the heat sink 15 herein have a plate shape elongating from a side far from the blow-out port 12 to a side near to the blow-out port 12.

Thus, when disposed in the blow-out port non-opposed space S23, the heat sink 15 is herein designed to be disposed on the slope 27*b* formed by the blow-out port non-opposed surface part 27. With the construction, the heat sink 15 can be herein disposed such that air blown out by the bladed wheel 51 of the centrifirgal fan 5 can flow at a high speed without increasing ventilation resistance as much as possible.

Consequently, the heat sink 15 can be herein disposed in the blow-out port non-opposed space S23 such that the electric components 14 can be efficiently cooled and simultaneously degradation in ventilation performance of the centrifugal fan 5 can be inhibited as much as possible. Furthermore, the fins 15*a* of the heat sink 15 herein have the shape along the airflow (i.e., the plate shape elongating from the side far from the blow-out port 12 to the side near to the blow-out port 12). Hence, ventilation resistance by the fins 15*a* can be also thereby inhibited as much as possible, and this contributes to efficient cooling of the electric components 14.

Figure 12:
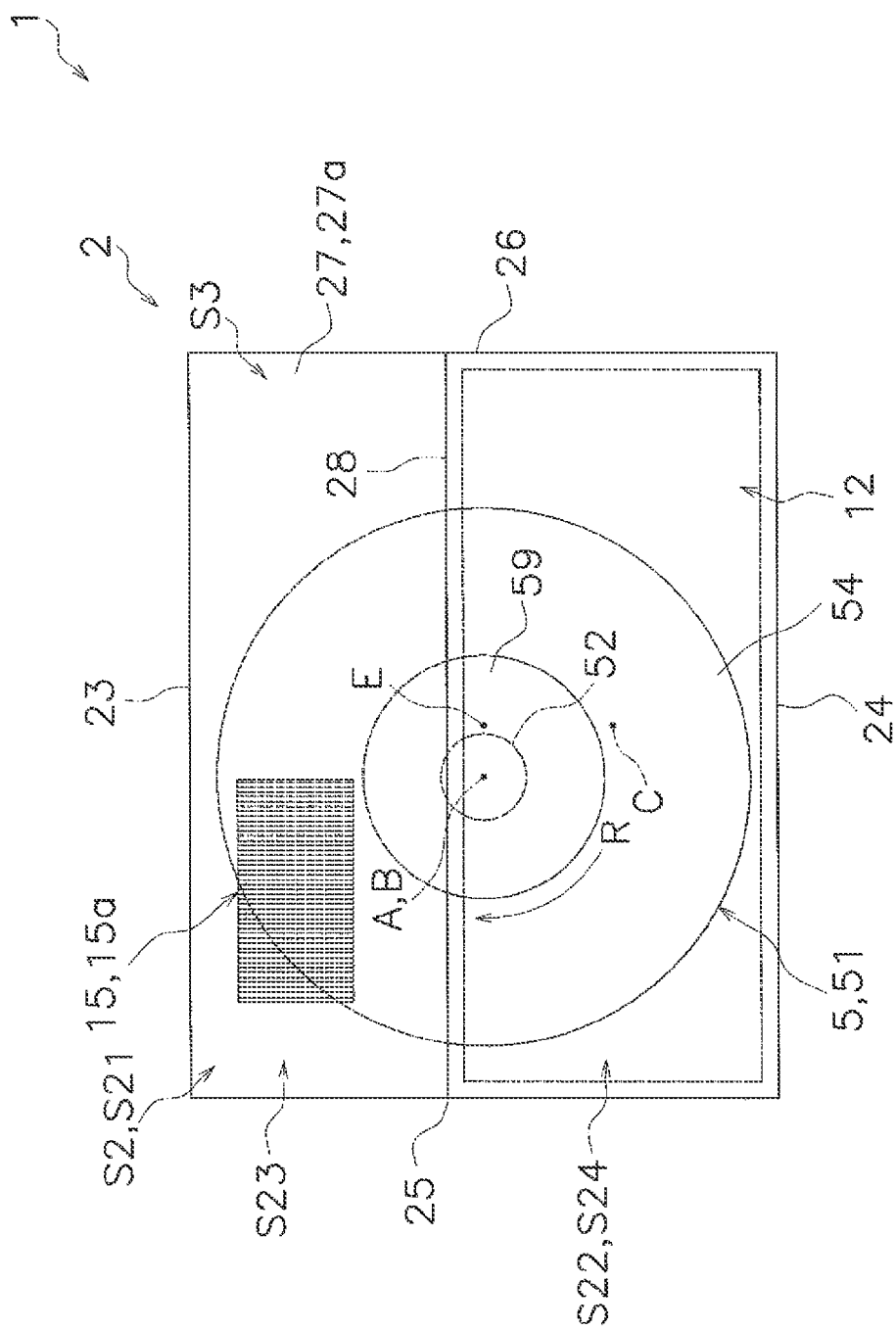
FIG. 12 is a top lateral view of the air conditioning apparatus from which a downstream lateral part is detached (in the vertical mount configuration)

Moreover, the slope 27*b* is herein disposed so as to overlap with the fan motor 59 when seen from the direction along the rotary shaft 52 (the rotary axis A) (i.e., the opening direction B of the fan entrance 13 and the opening direction C of the blow-out port 12) (see FIGS. 10 and 12). More specifically, when the casing 2 is seen from the blow-out port 12 side, the blow-out port 12 side end of the blow-out port non-opposed surface part 27 forming the slope 27*b* (or the blow-out port circumferential surface part 28 that is joined to the blow-out port 12 side end and extends toward the blowout port 12) is disposed in a position across the fan motor 59. With the construction, a part of the slope 27*b* formed by the blow-out port non-opposed surface part 27, i.e., a part located closely to the blow-out port 12, overlaps with the fan motor 59. FIG. 12 is herein a top lateral view of the air conditioning apparatus 1 from which the downstream lateral part 22 is detached (in the vertical mount configuration). It should be noted that the electric components 14, the motor support base 34 and the electric heater 6 (the heating means) are not illustrated in FIG. 12.

Thus, when the fan motor 59 is herein disposed in the fan downwind space S21, the slope 27*b* is designed to overlap with the fan motor 59 in a view seen from the direction along the rotary shaft 52 (the rotary axis A) (i.e., the opening direction B of the fan entrance 13 and the opening direction C of the blow-out port 12). With the construction, the fan motor 59 and the slope 27*b* on which air blown out by the bladed wheel 51 of the centrifugal fan 5 flows at a high speed can be herein disposed adjacently to each other in a direction orthogonal to the rotary shaft 52 (the rotary axis A) (i.e., the horizontal direction X orthogonal to the rotary axis A and the opening directions B and C in the vertical mount configuration; the right-and-left direction Y orthogonal to the rotary axis A and the opening directions B and C in the horizontal mount configuration).

Consequently, the fan motor 59 can be herein disposed in the fan downwind space S21 so as to be capable of being efficiently cooled by air blown out by the bladed wheel 51 of the centrifugal fan 5.

Figure 13:
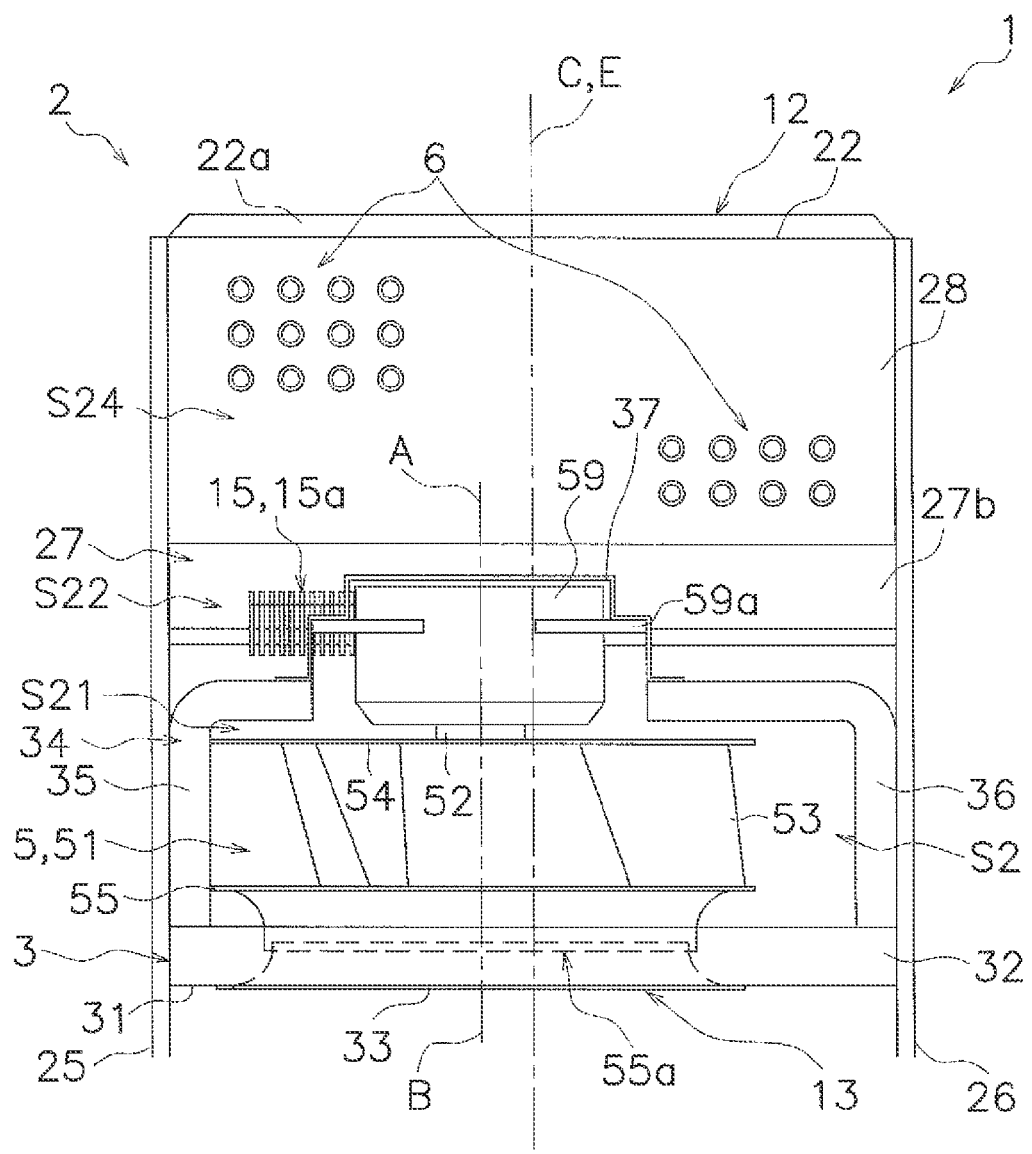
FIG. 13 is an enlarged view of the fan compartment and its vicinity in FIG. 3.

Moreover, the slope 27*b* is herein disposed so as to overlap with the fan motor 59 when seen from a direction orthogonal to the rotary shaft 52 (the rotary axis A) (i.e., the horizontal direction X orthogonal to the rotary axis A and the opening directions B and C in the vertical mount configuration; the right-and-left direction Y orthogonal to the rotary axis A and the opening directions B and C in the horizontal mount configuration) (see FIGS. 10 and 13). More specifically, the fan entrance 13 side end of the blow-out port non-opposed surface part 27 forming the slope 27*b* is disposed in a position across the fan motor 59 when the casing 2 is seen from the first lateral part 23 side or the second lateral part 24 side. Accordingly, a part of the slope 27b formed by the blow-out port non-opposed surface part 27, i.e., a part located closely to the fan entrance 13, overlaps with the fan motor 59. FIG. 13 is herein an enlarged view of the fan compartment S2 and its vicinity in FIG. 3.

Thus, when the fan motor 59 is herein disposed in the fan downwind space S21, the slope 27b is designed to overlap with the fan motor 59 when seen from the direction orthogonal to the rotary shaft 52 (the rotary axis A) (i.e., the horizontal direction X orthogonal to the rotary axis A and the opening directions B and C in the vertical mount configuration; the right-and-left direction Y orthogonal to the rotary axis A and the opening directions B and C in the horizontal mount configuration). With the construction, the fan motor 59 and the slope 27b on which air blown out by the bladed wheel 51 of the centrifugal fan 5 flows at a high speed can be herein disposed adjacently to each other in the direction along the rotary shaft 52 (the rotary axis A) (i.e., the opening directions B of the fan entrance 13 and the opening direction C of the blow-out port 12).

Consequently, the fan motor 59 can be herein disposed in the fan downwind space S21 so as to be capable of being efficiently cooled by air blown out by the bladed wheel 51 of the centrifugal fan 5.

Moreover, the heat sink 15 is herein disposed so as not to at least partially overlap with the fan motor 59 when seen from the direction along the rotary shaft 52 (the rotary axis A) (i.e., the opening direction B of the fan entrance 13 and the opening direction C of the blow-out port 12) (see FIGS. 10 and 12). More specifically, when the casing 2 is seen from the blow-out port 12 side, the heat sink 15 is disposed such that one part thereof (herein, a left part in FIG. 12) does not overlap with the fan motor 59 whereas the remaining part thereof (a right part) overlaps with the fan motor 59. It should be noted that the heat sink 15 may be disposed such that the entirety thereof does not overlap with the fan motor 59 when the casing 2 is seen from the blowout port 12 side, although this construction is not herein employed.

Thus, when the fan motor 59 is herein disposed in the fan downwind space S21, the heat sink 15 is designed not to at least partially overlap with the fan motor 59 in a view seen from the direction along the rotary shaft (the rotary axis A) (i.e., the opening direction B of the fan entrance 13 and the opening direction C of the blow-out port 12). With the construction, two components for which cooling is required, i.e., the heat sink 15 and the fan motor 59 can be herein disposed so as to be displaced from each other.

Consequently, the heat sink 15 and the fan motor 59 can be herein disposed in the fan downwind space S21 such that the electric components 14 and the fan motor 59 can be efficiently cooled by air blown out by the bladed wheel 51 of the centrifugal fan 5.

Moreover, the heat sink 15 is herein disposed on the upwind side of the electric heater 6 (the heating means) (see FIGS. 1, 3-5, 7, 10 and 13).

Thus, when the electric heater 6 (the heating means) is herein disposed in the fan downwind space S21, the electric heater 6 (the heating means) is designed to be mounted in the blow-out port opposed space S22 whereas the heat sink 15 is designed to be disposed on the upwind side of the electric heater 6 (the heating means). With the construction, air blown out by the bladed wheel 51 of the centrifugal fan 5 is herein configured to cool the electric components 14 and be then heated by the electric heater 6 (the heating means). Accordingly, the electric components 14 can be cooled by air with lower temperature in comparison with when the electric heater 6 (the heating means) is disposed on the upwind side of the heat sink 15.

Consequently, the heat sink 15 and the electric heater 6 (the heating means) can be herein disposed in the fan downwind space S21 such that the electric components 14 can be efficiently cooled by air blown out by the bladed wheel 51 of the centrifugal fan 5.

(5) Construction for Inhibiting Degradation in Ventilation Performance of Centrifugal Fan In the air conditioning apparatus 1 having the aforementioned construction, the fan motor 59 is disposed in the fan downwind space S21, and hence, cooling is configured to be enabled fir the fan motor 59 by air blown out by the bladed wheel 51.

In view of the above, the bladed wheel 51 is herein contrived in shape when the fan motor 59 is herein disposed in the fan downwind space S21. Specifically, the hub 54 of the bladed wheel 51 is designed not to have a motor cooling aperture to be bored for cooling the fan motor 59 by causing air, blown out to the fan downwind space S21 by the bladed wheel 51, to partially flow back to the bladed wheel 51 therethrough (see FIG. 6). With the construction, it is herein possible to eliminate the airflow that air, blown out to the fan downwind space S21 by the bladed wheel 51, partially flows back to the bladed wheel 51 through the motor cooling aperture.

Consequently, degradation in ventilation performance of the centrifugal fan 5 can be herein inhibited.

(6) Construction for Further Enhancing Ventilation Performance of Centrifugal Fan In the air conditioning apparatus 1 having the aforementioned construction, the centrifugal fan 5 having the rearward blades 53 is mounted in the fan compartment S2 having the fan entrance 13 bored in opposition to the blow-out port 12 such that the rotary shaft 52 (the rotary axis A) is oriented to the opening direction B of the fan entrance 13 and the opening direction C of the blow-out port 12.

Immediately after blown out by the bladed wheel 51 of the centrifugal fan 5, air herein has a strong flow component directed in the radial direction of the bladed wheel 51 (i.e., a radial component), and this contributes to increase in ventilation resistance in the fan compartment S2.

Figure 14:
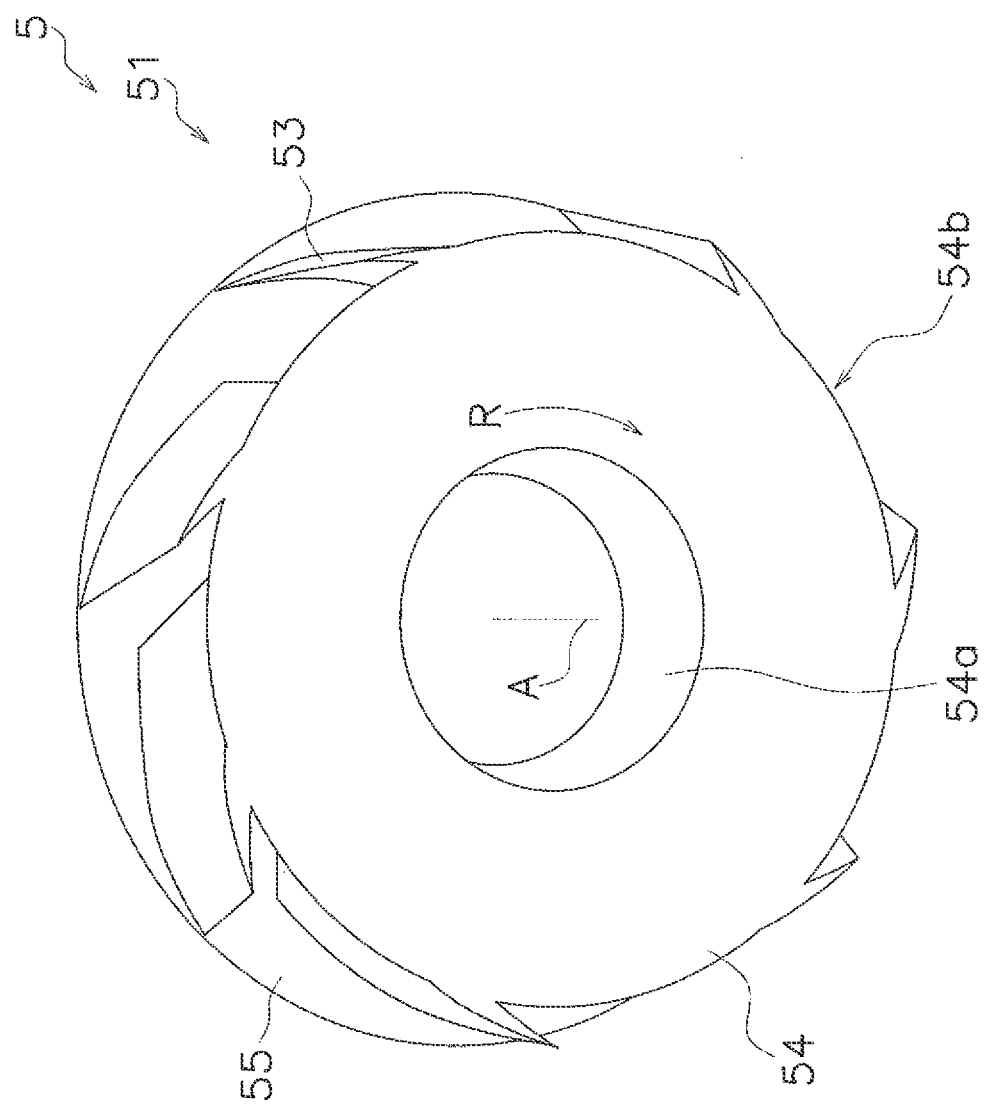
FIG. 14 is an external perspective view of the bladed wheel that inter-blade parts of a hub are cut out.

In view of the above, the bladed wheel 51 is herein further contrived in shape. Specifically as shown in FIG. 14, a type of bladed wheel 51 is employed that inter-blade parts 54b of the hub 54, located among the plural rearward blades 53, are cut out. FIG. 14 is herein an external perspective view of the bladed wheel 51 that the inter-blade parts 54b of the hub 54 are cut out.

Thus, when the bladed wheel 51 with the cut-out inter-blade parts 54b is employed, air can be strengthened in its axial component and weakened in its radial component immediately after blown out by the bladed wheel 51 of the centrifugal fan 5. The air can be thereby strengthened in its oblique flow tendency, and hence, ventilation resistance can be reduced in the fan compartment S2.

Consequently, the ventilation performance of the centrifugal fan 5 can be herein further enhanced.

The invention claimed is:
1. An air conditioning apparatus, comprising:
a casing having an intake port and a blow-out port;
a partition member dividing an interior of the casing into
a heat exchanger compartment located on an intake port side and a fan compartment located on a blow-out port side, the partition member having a fan entrance, the fan entrance being bored in opposition to the blow-out port and making the heat exchanger compartment and the fan compartment communicate with each other;

a heat exchanger mounted in the heat exchanger compartment;

a centrifugal fan including a bladed wheel having a plurality of rearward blades and being configured to suck air existing in the heat exchanger compartment into the fan compartment through the fan entrance, with the bladed wheel being mounted in the fan compartment such that a rotary shaft of the bladed wheel is oriented along a first axial direction perpendicular to a second lateral direction along which the partition member extends;

a heat sink configured and arranged to cool an electric component, the heat sink being mounted in a blow-out port non-opposed space, the blow-out port non-opposed space being a region not opposed to the blow-out port within a fan downwind space, the fan downwind space being located on a downwind side of the bladed wheel within the fan compartment; and a blow-out port non-opposed surface part forming the blow-out port non-opposed space and being opposed to the fan entrance in a position on the downwind side of the bladed wheel, the rotary shaft of the bladed wheel being disposed in a position adjacent to a bladed wheel nearby lateral part, the bladed wheel nearby lateral part being one of multiple lateral parts of the casing that are disposed along the first axial direction, the blow-out port being at least partially disposed in a position adjacent to a blow-out port nearby lateral part, the blow-out port nearby lateral part being another one of the multiple lateral parts of the casing and being opposed to the bladed wheel nearby lateral part, the blow-out port non-opposed surface part forming a slope slanting so as to be extending gradually away from the bladed wheel from a region adjacent to the fan entrance to a region adjacent to the blow-out port, and the heat sink being disposed on the slope.

2. The air conditioning apparatus according to claim 1, wherein the bladed wheel has a hub, the hub connecting blow-out port side ends of the rearward blades and being configured to be rotated about the rotary shaft, the air conditioning apparatus further comprises a fan motor, the fan motor being coupled to the hub and being mounted in the fan downwind space, and the slope is disposed so as to overlap with the fan motor when seen from a direction along the rotary shaft.

3. The air conditioning apparatus according to claim 1, wherein the bladed wheel has a hub, the hub connecting blow-out port side ends of the rearward blades and being configured to be rotated about the rotary shaft, the air conditioning apparatus further comprises a fan motor, the fan motor being coupled to the hub and being mounted in the fan downwind space, and the slope is disposed so as to overlap with the fan motor when seen from a direction orthogonal to the rotary shaft.

4. The air conditioning apparatus according to claim 1, wherein the bladed wheel has a hub, the hub connecting blow-out port side ends of the rearward blades and being configured to be rotated about the rotary shaft, the air conditioning apparatus further comprises a fan motor, the fan motor being coupled to the hub and being mounted in the fan downwind space, and the heat sink is disposed so as not to overlap with the fan motor when seen from a direction along the rotary shaft.

5. The air conditioning apparatus according to claim 1, wherein the bladed wheel has a hub, the hub connecting blow-out port side ends of the rearward blades and being configured to be rotated about the rotary shaft, the air conditioning apparatus further comprises a fan motor, the fan motor being coupled to the hub and being mounted in the fan downwind space, and the hub does not have a motor cooling aperture bored to cool the fan motor by causing air blown out to the fan downwind space by the bladed wheel to partially flow back to the bladed wheel therethrough.

6. The air conditioning apparatus according to claim 1, further comprising:

a heater arranged and configured to heat air blown out to the fan downwind space by the bladed wheel, the heater being mounted in a blow-out port opposed space, the blow-out port opposed space being a region opposed to the blow-out port within the fan downwind space, the heat sink being disposed on an upwind side of the heater.

* * * * *